(12) United States Patent
Izuoka et al.

(10) Patent No.: US 12,047,675 B2
(45) Date of Patent: Jul. 23, 2024

(54) ELECTRONIC APPARATUS AND ITS CONTROL METHOD, AND ACCESSORY AND ITS CONTROL METHOD

(71) Applicant: CANON KABUSHIKI KAISHA, Tokyo (JP)

(72) Inventors: Hirokazu Izuoka, Kanagawa (JP); Yuki Tsujimoto, Tokyo (JP); Tsuyoshi Fujisaki, Tokyo (JP); Takayuki Hoshina, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 17/725,213

(22) Filed: Apr. 20, 2022

(65) Prior Publication Data
US 2022/0345637 A1 Oct. 27, 2022

(30) Foreign Application Priority Data
Apr. 23, 2021 (JP) ................................. 2021-073066

(51) Int. Cl.
*H04N 23/65* (2023.01)
*G03B 17/56* (2021.01)

(52) U.S. Cl.
CPC ......... *H04N 23/651* (2023.01); *G03B 17/566* (2013.01); *G03B 2206/00* (2013.01); *G03B 2217/007* (2013.01)

(58) Field of Classification Search
CPC ............... H04N 23/651; H04N 23/663; G03B 17/566; G03B 2206/00; G03B 2217/007; G03B 15/05; G03B 17/561; G03B 2215/056
See application file for complete search history.

(56) References Cited

U.S. PATENT DOCUMENTS

| 2013/0022348 | A1 | 1/2013 | Hasuda |
| 2014/0009671 | A1 | 1/2014 | Ozone |
| 2020/0304711 | A1* | 9/2020 | Suzuki ................... H04N 23/51 |

FOREIGN PATENT DOCUMENTS

JP 2018-005244 A 1/2018

OTHER PUBLICATIONS

A European Search Report issued on Sep. 22, 2022, that issued in the corresponding European Patent Application No. 22169477.1.

* cited by examiner

*Primary Examiner* — Timothy J Henn
(74) *Attorney, Agent, or Firm* — Cowan, Liebowitz & Latman, P.C.

(57) ABSTRACT

An electronic apparatus attachable to an accessory includes a power supply unit, and a control unit for controlling the power supply unit. The electronic apparatus can transition from a normal operating state to a power-saving state that includes a first power-saving state in which a power supply switch of the electronic apparatus is turned off, and a second power-saving state in which a non-operating state continues for a predetermined time. The control unit receives first information indicating whether or not the power supply from the electronic apparatus to the accessory is requested in the first power-saving state, and second information indicating whether or not the power supply from the electronic apparatus to the accessory is requested in the second power-saving state. The control unit causes the power supply unit to supply the power in the power-saving state where the power supply is requested.

13 Claims, 24 Drawing Sheets

| | 1ST BYTE | 2ND BYTE | 3RD BYTE | ... | (N-2)TH BYTE | (N-1)TH BYTE | NTH BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 4

| ADDRESS | D7 | D6 | D5 | D4 | D3 | D2 | D1 | D0 |
|---|---|---|---|---|---|---|---|---|
| 0x00 | ACC TYPE ||||||||
| 0x01 | ACC ID NO. ||||||||
| 0x02 | FIRMWARE VER. ||||||||
| 0x03 | POWER SUPPLY DURING POWER-OFF || POWER SUPPLY DURING AUTOMATIC POWER-OFF | | POWER SUPPLY SPECIFICATION || CHARGEABILITY ||
| 0x04 | REQUEST POWER ||||||||
| 0x05 | FIRMWARE UPDATE MODE | FIRMWARE UPDATE FUNCTION | INTERMEDIATE ACCESSORY OPERATION PERMISSION | INTERMEDIATE ACCESSORY CONFIRMATION AT START ||| I2C COMMAND COMMUNICATION AVAILABILITY ||
| 0x06 | RESERVE ||| COMMUNICATION REQUEST FACTOR ACQUIRING METHOD | FUNCTIONAL SIGNAL 4 | FUNCTIONAL SIGNAL 3 | FUNCTIONAL SIGNAL 2 | FUNCTIONAL SIGNAL 1 |
| 0x07 | RESERVE ||||||||
| 0x08 | RESERVE ||||||||
| 0x09 | RESERVE ||||||||
| 0x0A | SILENT START | COMMUNICATION REQUEST FACTOR |||||||
| 0x0B | RESERVE ||||||||
| 0x0C | RESERVE |||||| SPI PROTOCOL | CS LOGIC |
| 0x0D | COMMUNICATION INTERVAL BETWEEN SPI BYTES ||||||||
| 0x0E | COMMUNICATION INTERVAL BETWEEN SPI BYTES (IN FIRMWARE UPDATE MODE) ||||||||
| 0x0F | CHECKSUM ||||||||

FIG. 5

| NO. | TYPE |
|---|---|
| 0x00 | RESERVE |
| 0x01 | RESERVE |
| : | : |
| 0x80 | RESERVE |
| 0x81 | STROBE |
| 0x82 | INTERFACE CONVERSION ADAPTER |
| 0x83 | MICROPHONE |
| 0x84 | MULTI-ACCESSORY CONNECTION ADAPTER |
| 0x85 | RESERVE |
| 0x86 | RESERVE |
| 0x87 | RESERVE |
| 0x88 | RESERVE |
| 0x89 | RESERVE |
| 0x90 | RESERVE |
| : | : |
| 0xFF | RESERVE |

FIG. 7

| FACTOR NO. | FACTOR CONTENT |
|---|---|
| 0x00 | PRESS OF MENU CALL SW |
| 0x01 | VOICE STABILIZATION COMPLETION |
| 0x02 | VOICE UNMUTE |
| 0x03 | |
| 0x04 | |
| 0x05 | |
| 0x06 | |
| 0x07 | |
| : | |
| 0x79 | |
| 0x7A | |
| 0x7B | |
| 0x7C | |
| 0x7D | |
| 0x7E | |
| 0x7F | |

FIG. 8

| | COMMUNICATION INTERVAL |
|---|---|
| 0 | 1us |
| 1 | 2us |
| 2 | 5us |
| 3 | 10us |
| 4 | 15us |
| 5 | 25us |
| 6 | 50us |
| 7 | 100us |

FIG. 9A

| | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

FIG. 9B

ELECTRONIC APPARATUS AND ITS CONTROL METHOD, AND ACCESSORY AND ITS CONTROL METHOD

BACKGROUND OF THE INVENTION

Field of the Invention

The present invention relates to an electronic apparatus, such as an image pickup apparatus to which an accessory is attachable.

Description of the Related Art

Some accessories attachable to an image pickup apparatus that serves as an electronic apparatus do not have a built-in battery and are operable under a power supply from the image pickup apparatus. Japanese Patent Laid-Open No. ("JP") 2018-5244 discloses control for switching an accessory from a normal operating state to a power-saving state according to the state of the image pickup apparatus in order to reduce the power consumption of the image pickup apparatus caused by the power supply to the accessory.

However, in order to return the accessory in the power-saving state to the normal operating state, it is necessary to restart the power supply to the accessory and it takes a long time to power on the accessory and to return the accessory to the normal operating state. This time may cause a user to miss a photo opportunity.

SUMMARY OF THE INVENTION

The present invention provides an electronic apparatus, a control method of the electronic apparatus, an accessory, and a control method of the accessory, each of which can improve the power-saving performance of the electronic apparatus and quickly secure an operation of the accessory when the accessory is returned from a power-saving state.

An electronic apparatus according to one aspect of the present invention which an accessory is attachable to, detachable from, and communicable with includes a power supply unit configured to supply power to the accessory, and a control unit configured to control a power supply from the power supply unit to the accessory. The electronic apparatus is configured to transition from a normal operating state to a power-saving state that includes a first power-saving state in which a power supply switch of the electronic apparatus is turned off, and a second power-saving state in which a non-operating state continues for a predetermined time. The control unit receives, as power supply necessity/unnecessity information, first information indicating whether or not the power supply from the electronic apparatus to the accessory is requested when the electronic apparatus is in the first power-saving state, and second information indicating whether or not the power supply from the electronic apparatus to the accessory is requested when the electronic apparatus is in the second power-saving state. The control unit causes the power supply unit to supply the power to the accessory in the power-saving state in a case where the power supply necessity/unnecessity information indicates a request for the power supply. A control method of the above electronic apparatus also constitutes another aspect of the present invention.

An accessory according to another aspect of the present invention is attachable to, detachable from, and communicable with an electronic apparatus. The accessory includes an accessory processing unit configured to transmit information to the electronic apparatus, and a power-supplied unit supplied with power from the electronic apparatus. The accessory processing unit transmits, as power supply necessity/unnecessity information, to the electronic apparatus first information indicating whether or not a power supply from the electronic apparatus to the accessory is requested when the electronic apparatus is in a first power-saving state in which a power supply switch of the electronic apparatus is turned off, and second information indicating whether or not the power supply from the electronic apparatus to the accessory is requested when the electronic apparatus is in a second power-saving state in which a non-operating state continues for a predetermined time. A control method of the above accessory also constitutes another aspect of the present invention.

Further features of the present invention will become apparent from the following description of exemplary embodiments with reference to the attached drawings.

BRIEF DESCRIPTION OF THE DRAWINGS

FIG. 4 illustrates communication data in the SPI communication in the first embodiment.

FIG. 5 illustrates accessory information in the first embodiment.

FIG. 7 illustrates accessory type information in the first embodiment.

FIG. 8 illustrates factors that generate a communication request in the first embodiment.

FIGS. 9A and 9B illustrate communication intervals in the SPI communication in the first embodiment.

DESCRIPTION OF THE EMBODIMENTS

Referring now to the accompanying drawings, a description will be given of embodiments according to the present invention.

First Embodiment

Figure 1:
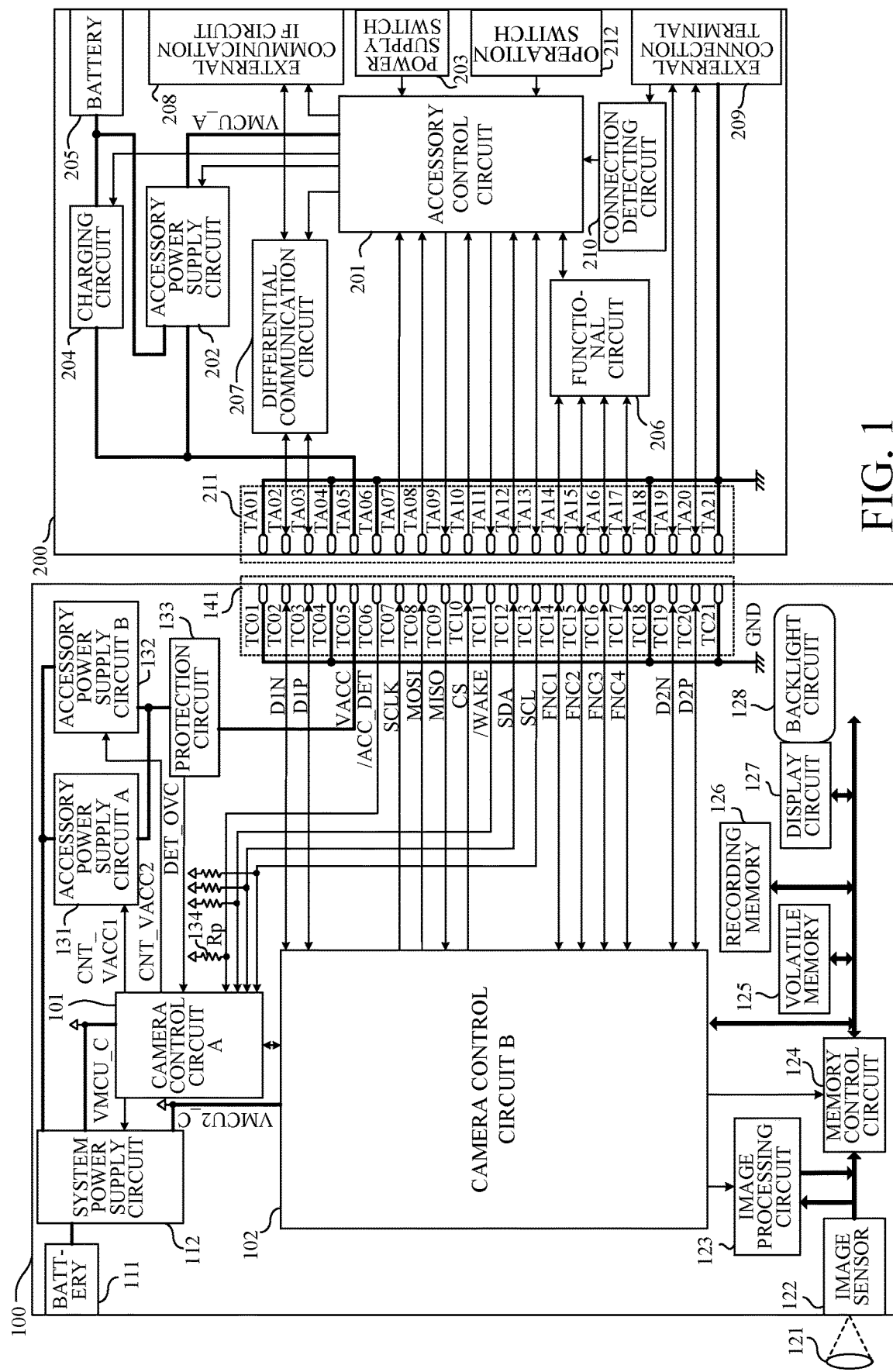
FIG. 1 illustrates a configuration of a camera system (including a camera, a lens unit, and an accessory) in a first embodiment.

FIG. 1 illustrates an electrical configuration of an image pickup system including an image pickup apparatus (referred to as a camera hereinafter) 100 as an electronic apparatus according to a first embodiment of the present invention, and an accessory 200 detachably attached to the image pickup apparatus. The accessory 200 is, for example, a microphone device or an illumination (strobe or flash) device, and includes various devices that are attachable to the camera 100. The camera 100 and the accessory 200 are electrically connected via one-to-one contacts between a plurality of contacts (terminals) TC01 to TC21 of a camera connector 141 provided in the camera 100 and a plurality of contacts TA01 to TA21 of an accessory connector 211 provided in the accessory 200, respectively. The accessory 200 may not have part of the plurality of contacts TA01 to TA21.

The camera 100 is supplied with power from a battery 111. The battery 111 is attachable to and detachable from the camera 100. A camera control circuit A 101 that serves as a first processing unit, a control unit, and a receiving unit in the camera 100 and a camera control circuit B 102 that serves as a second processing unit are circuits that control the entire camera 100, and include a processor (microcomputer) such as a CPU. The camera control circuit A 101 and the camera control circuit B 102 execute various controls and processing in accordance with a computer program.

The camera control circuit A 101 monitors operations of switches and the like for unillustrated camera operations, and controls a system power supply according to the operation of the user. The camera control circuit A 101 includes a low power type processor that is operable even when the camera 100 is in a power-saving state as a low power consumption state. On the other hand, the camera control circuit B 102 is responsible for controlling an image sensor 122, a display circuit 127, and the like. The camera control circuit B 102 includes a processor that stops operating in the low power consumption mode and operates in a normal operating state.

Although the camera control circuit A 101 and the camera control circuit B 102 include separate processors in this embodiment, these may be provided in a single processor.

A system power supply circuit 112 is a circuit that generates power to be supplied to each circuit in the camera 100, and includes a DC/DC converter circuit, Low Drop Out (LDO), a charge pump circuit, and the like. A voltage of 1.8 V that is generated by the system power supply circuit 112 that receives power from the battery 111 is constantly supplied as camera microcomputer power supply VMCU_C to the camera control circuit A 101. Several types of voltages that are generated by the system power supply circuit 112 are supplied as camera microcomputer power supply VMCU2_C to the camera control circuit B 102 at an arbitrary timing. The camera control circuit A 101 controls turning on and off of the power supply to each circuit in the camera 100 by controlling the system power supply circuit 112.

An optical lens 121 is attachable to and detachable from the camera 100. Light from an object incident through the optical lens 121 is imaged on the image sensor 122 including a CMOS sensor, a CCD sensor, or the like. The optical lens 121 and the camera 100 may be integrated. An object image formed on the image sensor 122 is encoded into a digital imaging signal. An image processing circuit 123 performs image processing such as noise reduction processing and white balance processing for the digital imaging signal to generate image data, and converts the image data into an image file in a JPEG format or the like in order to record the image data in a recording memory 126. The image processing circuit 123 generates from the image data VRAM image data to be displayed on the display circuit 127.

A memory control circuit 124 controls transmissions and receptions of image data and other data generated by the image processing circuit 123 and the like. A volatile memory 125 is a memory capable of high-speed reading and writing such as DDR3SDRAM, and is used as a workspace for image processing that is performed by the image processing circuit 123. The recording memory 126 is a readable and writable recording medium such as an SD card or a CFexpress card that is attachable to and detachable from the camera 100 via an unillustrated connector. The display circuit 127 is a display disposed on a back surface of the camera 100, and includes an LCD panel, an organic EL display panel, and the like. A backlight circuit 128 adjusts the brightness of the display circuit 127 by changing the light amount of the backlight of the display circuit 127.

Each of a power supply circuit A for the accessory (accessory power supply circuit A hereinafter; first power supply unit) 131 and a power supply circuit B for the accessory (accessory power supply circuit B hereinafter; second power supply unit) 132 is a voltage conversion circuit that converts voltage supplied from the system power supply circuit 112 into predetermined voltage and generates 3.3 V as accessory power supply VACC in this embodiment. This configuration may convert the voltage into another voltage.

The accessory power supply circuit A 131 is a power supply circuit that includes LDO or the like and has a low self-power consumption. The accessory power supply circuit B 132 includes a DC/DC converter circuit or the like, and can pass current larger (or supply power higher) than that of the accessory power supply circuit A 131. The self-power consumption of the accessory power supply circuit B 132 is larger than that of the accessory power supply circuit A 131. Therefore, when a load current is small, the accessory power supply circuit A 131 is more efficient than the accessory power supply circuit B 132, and when the load current is large, the accessory power supply circuit B 132 is more efficient than the accessory power supply circuit A 131. The camera control circuit A 101 controls turning on and off of voltage outputs of the accessory power supply circuits A 131 and B 132 according to the operating state of the accessory 200.

A protection circuit 133 includes a current fuse element, an electronic fuse circuit in which a poly-switch element or a resistor, an amplifier, and a switching element are combined, or the like. The protection circuit 133 outputs overcurrent detecting signal DET_OVC when power supply current values supplied to the accessory 200 from the accessory power supply circuits A 131 and B 132 are higher than a predetermined value and become excessive (abnormal). In this embodiment, the protection circuit 133 is the electronic fuse circuit, and notifies the camera control circuit A 101 of the overcurrent detecting signal DET_OVC when a current of 1 A or more flows. The overcurrent detecting signal DET_OVC indicates the overcurrent by becoming at a high level. The predetermined value may be different from 1 A.

The camera connector 141 is a connector for an electrical connection with the accessory 200 via 21 contacts TC01 to TC21 that are arranged in a row. The contacts TC01 to TC21 are arranged in this order from one end to the other end in this arrangement direction.

TC01 is connected to the ground (GND) and serves not only as a reference potential contact but also as a contact for controlling wiring impedances of the differential signals D1N and D1P. TC01 corresponds to a third ground contact.

The differential signal D1N that is connected to TC02 and the differential signal D1P that is connected to TC03 are differential data communication signals that perform data communications in pairs, and are connected to the camera control circuit B 102. TC02, TC03, TC07 to TC10, TC12 to TC17, TC19 and TC20, which will be described below, are communication contacts.

TC04 as a first ground contact is connected to GND and serves as a reference potential contact for the camera 100 and the accessory 200. TC04 is disposed outside TC05 described below in the contact arrangement direction.

The accessory power supply VACC generated by the accessory power supply circuits A 131 and B 132 is connected to TC05 as a power supply contact via the protection circuit 133.

An accessory attachment detecting signal/ACC_DET is connected to TC06 as an attachment detecting contact. The accessory attachment detecting signal /ACC_DET is pulled up to the camera microcomputer power supply VMCU_C via a resistor element Rp 134 (such as 10 kΩ). The camera control circuit A 101 can detect whether or not the accessory 200 is attached by reading a signal level of the accessory attachment detecting signal/ACC_DET. If the signal level (potential) of the accessory attachment detecting signal/ ACC_DET is high (predetermined potential), it is detected that the accessory 200 is not attached, and if it is a low level (GND potential) as an active potential, it is detected that the accessory 200 is attached.

Changing the signal level (potential) of the accessory attachment detecting signal/ACC_DET from the high level (Hi) to the low level (Lo) when the camera 100 is powered on triggers various transmissions between the camera 100 and the accessory 200 via contacts.

The camera control circuit 101 supplies power to the accessory 200 via TC05 as the power supply contact in response to detecting the attachment of the accessory 200.

SCLK connected to TC07 as a communication contact, MOSI connected to TC08, MISO connected to TC09, and Chip Select (CS) connected to TC10 are signals for communications by a Serial Peripheral Interface (SPI) communication method (referred to as an SPI communication hereinafter) as a second communication method in which the camera control circuit B 102 becomes a communication master. SCLK is a clock signal, MOSI is a transmission signal, MISO is a reception signal, CS is a communication selecting signal serving as a signal for selecting a communication partner. In this embodiment, the SPI communication has a communication clock frequency of 1 MHz, a data length of 8 bits (1 byte), and a bit order of MSB first, and a full-duplex communication method.

Figure 2A:
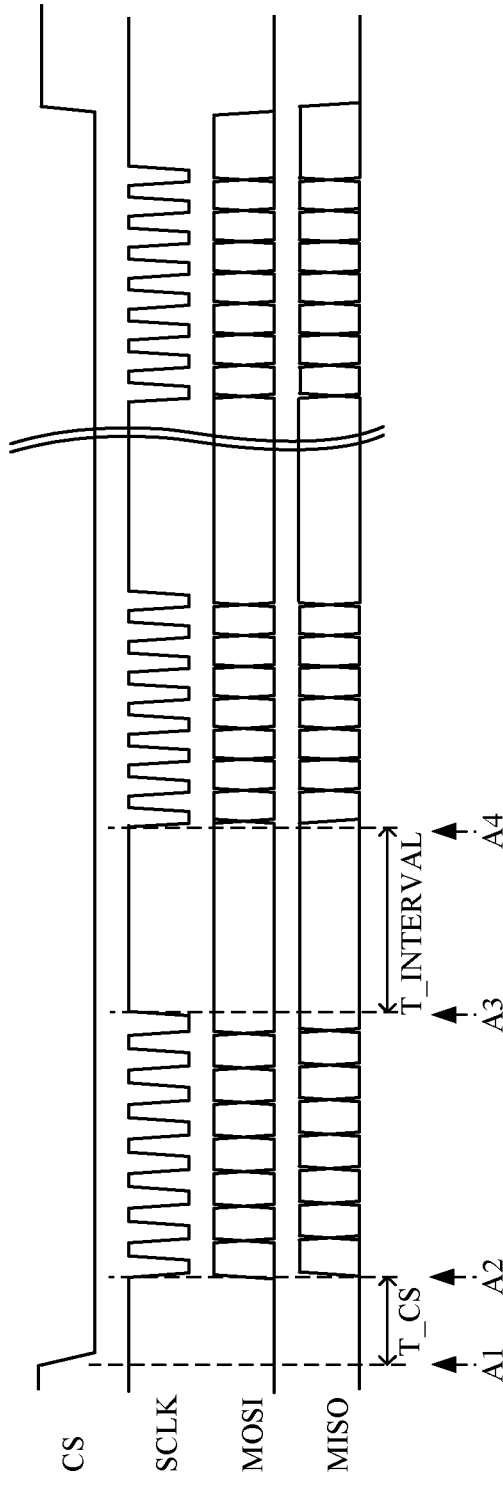
FIGS. 2A and 2B illustrate protocols for SPI communication in the first embodiment.

In this embodiment, the camera 100 and the accessory 200 support two types of communication protocols for the SPI communication method. Communication protocol A is a communication method in which the camera 100 does not confirm whether the accessory 200 is in a communicable state before outputting SCLK, and is referred to as SPI protocol A in the following description. FIG. 2A illustrates an outline of a communication waveform of the SPI protocol A. In this figure, CS is low-active.

The camera control circuit B 102 changes CS into a low level (active) at timing A1 and requests the accessory control circuit 201 for the SPI communication.

At timing A2 predetermined time T_CS after the timing A1, the camera control circuit B 102 starts outputting SCLK and MOSI. When the accessory control circuit 201 detects a trailing edge of SCLK, the accessory control circuit 201 starts outputting MISO.

The camera control circuit B 102 stops outputting SCLK at timing A3 when completing outputting 1-byte SCLK.

The camera control circuit B 102 stops outputting SCLK at the timing A3 for predetermined time T_INTERVAL, resumes the output of SCLK at timing A4 after the T_INTERVAL has elapsed, and performs the next 1-byte communication.

Figure 3A:
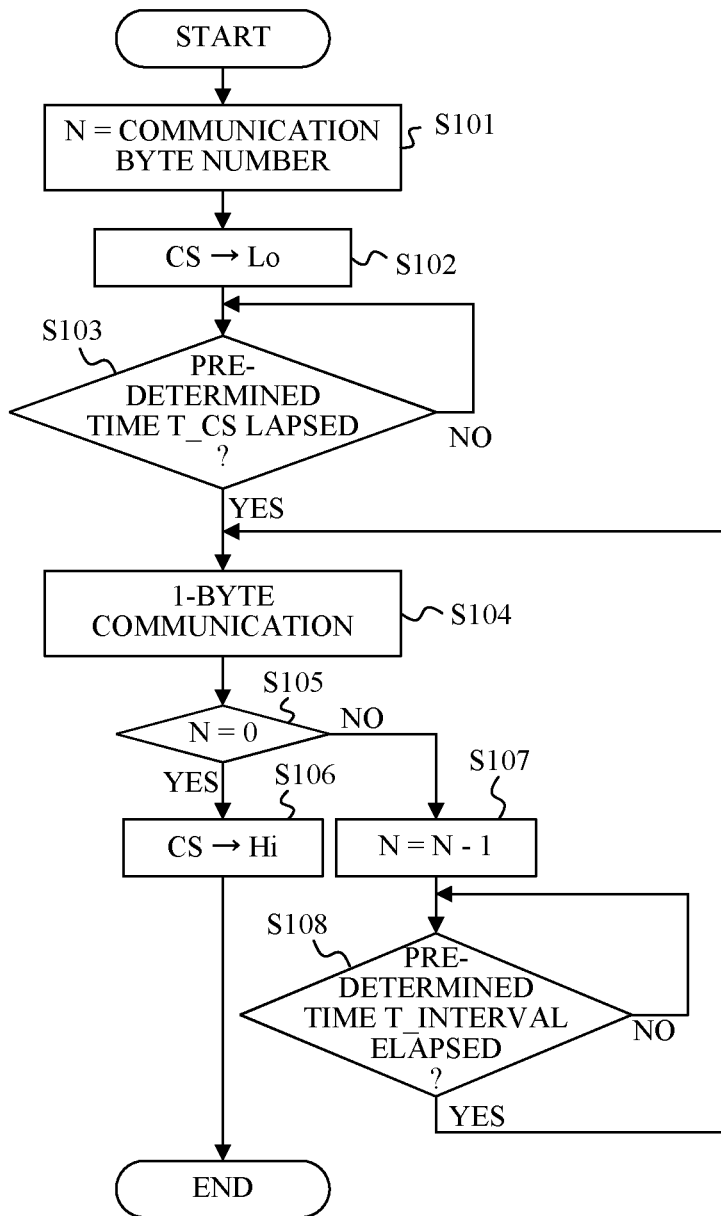
FIGS. 3A to 3D illustrate flowcharts showing processing to be performed by the camera and accessory in the first embodiment.

A flowchart in FIG. 3A illustrates processing to be performed by the camera control circuit B 102 in the SPI protocol A. S stands for the step.

In S101, the camera control circuit B 102 stores a numerical value indicating the number of bytes to be communicated in internal variable N. For example, 3 is stored in a case of 3-byte communication.

In S102, the camera control circuit B 102 changes CS to a low level and requests SPI communication.

In S103, the camera control circuit B 102 performs wait processing until predetermined time T_CS elapses after CS is changed to the low level. After the predetermined time T_CS elapses, the flow proceeds to S104.

In S104, the camera control circuit B 102 controls an SCLK output, a MOSI data output, and a MISO data input and performs 1-byte data communication.

In S105, the camera control circuit B 102 confirms whether or not the internal variable N indicating the number of communication bytes is 0. In the case where the internal variable N is 0, the flow proceeds to S106, and in the case where the internal variable N is other than 0, the flow proceeds to S107.

In S107, the camera control circuit B 102 stores as new internal variable N a value obtained by decrementing the numerical value of the internal variable N indicating the number of communication bytes by 1.

In S108, the camera control circuit B 102 performs wait processing until the predetermined time T_INTERVAL elapses after the 1-byte data communication in S104 is completed. Then, after the predetermined time T_INTERVAL elapses, the flow returns to the processing in S104, and the same processing is executed again.

In S106, the camera control circuit B 102 changes CS to a high level and ends a series of SPI communication.

Figure 3B:
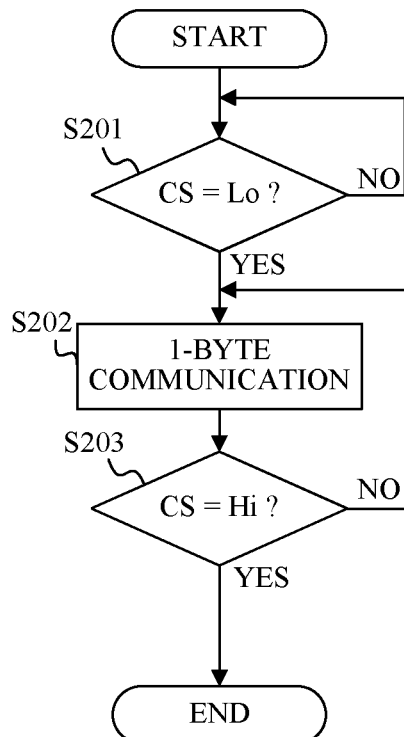

A flowchart in FIG. 3B illustrates processing to be performed by the accessory control circuit 201 in the SPI protocol A.

In S201, the accessory control circuit 201 confirms whether or not CS has changed to a low level. In the case where CS has changed to the low level, the flow proceeds to S202, and in the case where CS has not changed to the low level, the flow returns to S211.

In S202, the accessory control circuit 201 performs the 1-byte data communication by the MOSI data input control and MISO data output control in response to the input of the SCLK signal.

In S203, the accessory control circuit 201 confirms whether or not CS has changed to a high level. In the case where the CS has changed to the high level, it is determined that the SPI communication has been completed, and in the case where the CS has not changed to the high level, the flow returns to S202 so as to perform the next 1-byte communication.

Figure 2B:
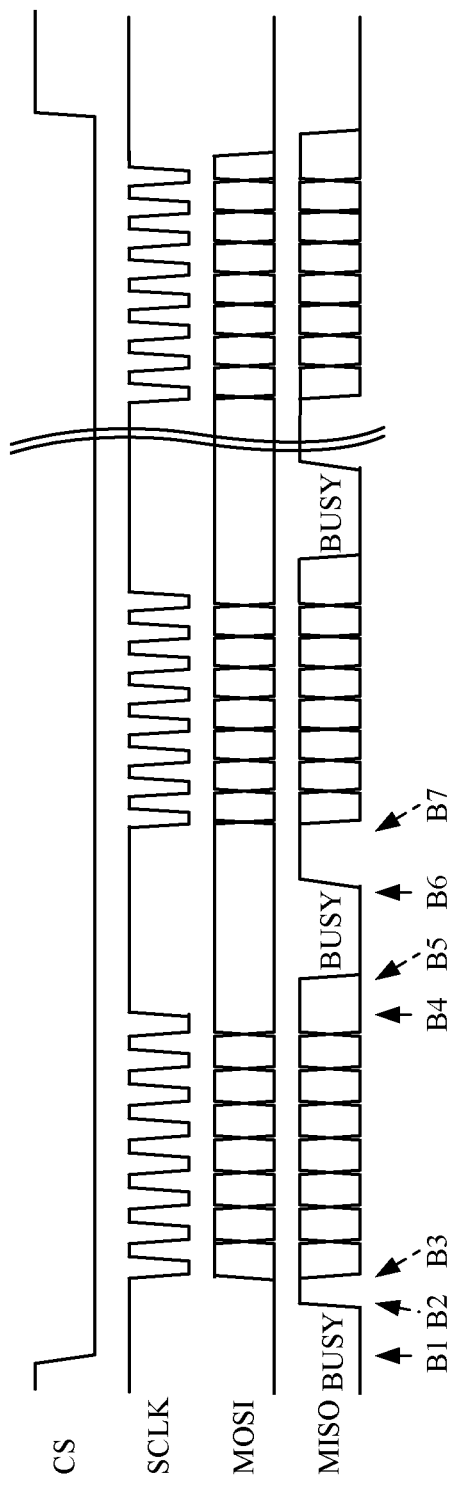

Communication protocol B in the SPI communication method is a communication method in which the camera 100 confirms whether the accessory 200 is in a communicable state before outputting SCLK, and is referred to as SPI protocol B in the following description. FIG. 2B illustrates an outline of a communication waveform of the SPI protocol B.

The camera control circuit B 102 changes the CS to a low level at timing B1 and requests the accessory control circuit 201 for the SPI communication. The camera control circuit B 102 confirms the potential of MISO together with the communication request. If MISO is at a high level, it is determined that the accessory control circuit 201 is in a communicable state, and if it is at a low level, it is determined that the accessory control circuit 201 is in an incommunicable state.

On the other hand, when the accessory control circuit 201 detects a trailing edge of CS at timing B2, the accessory control circuit 201 performs control for changing MISO to a high level if the SPI communication is available, and performs control for changing MISO to a low level if the communication is unavailable.

When the camera control circuit B 102 confirms that MISO is at a high level at timing B3, the camera control circuit B 102 starts outputting SCLK and MOSI. The accessory control circuit 201 starts outputting MISO when detecting a trailing edge of SCLK.

The camera control circuit B 102 stops outputting SCLK when the 1-byte SCLK output is completed at timing B4.

After the 1-byte communication, the accessory control circuit 201 performs control for changing MISO to a high level if the SPI communication is available, and control for changing MISO to a low level if the SPI communication is unavailable, as illustrated at timings B5 and B6.

The camera control circuit B 102 confirms the potential of MISO at timing B7. If MISO is at a high level, it is determined that the accessory control circuit 201 is in a communicable state, and if MISO is at a low level, it is determined that the accessory control circuit 201 is in an incommunicable state.

Figure 3C:
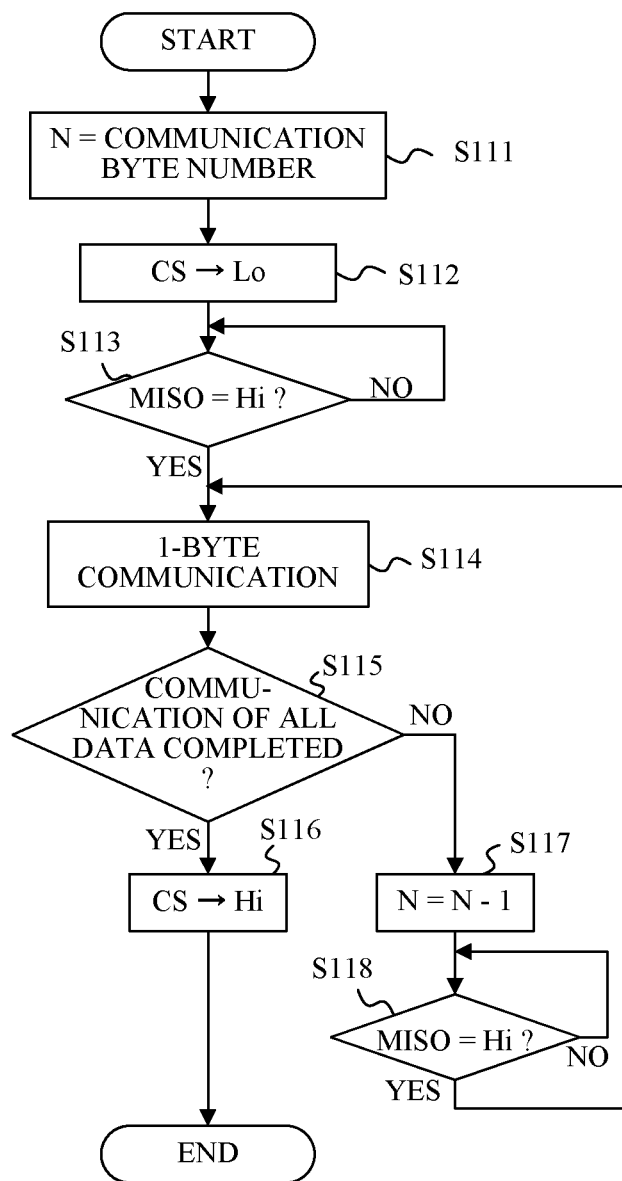

A flowchart in FIG. 3C illustrates processing to be performed by the camera control circuit B 102 in the SPI protocol B.

In S111, the camera control circuit B 102 stores a numerical value indicating the number of bytes to be communicated in the internal variable N. For example, 3 is stored in the case of 3-byte communication.

In S112, the camera control circuit B 102 changes CS to a low level and requests SPI communication.

In S113, the camera control circuit B 102 confirms whether MISO has changed to a high level. If MISO is at the high level, the flow proceeds to S114, and if MISO has not yet at the high level, the flow returns to S113.

In S114, the camera control circuit B 102 controls an SCLK output, a MOSI data output, and a MISO data input so as to perform 1-byte data communication.

In S115, the camera control circuit B 102 confirms whether or not the communications of all data have been completed (the internal variable N indicating the number of communication bytes is 0). In the case where the internal variable N is 0, the flow proceeds to S116, and in the case where the internal variable N is other than 0, the flow proceeds to S117.

In S117, the camera control circuit B 102 stores as new internal variable N a value obtained by decrementing the numerical value of the internal variable N indicating the number of communication bytes by 1.

In S118, the camera control circuit B 102 confirms whether or not MISO has changed to a high level. In the case where MISO is at the high level, the flow proceeds to S114, and in the case where MISO is not at the high level, the flow returns to S118.

In S116, the camera control circuit B 102 changes CS to a high level and ends a series of SPI communications.

Figure 3D:
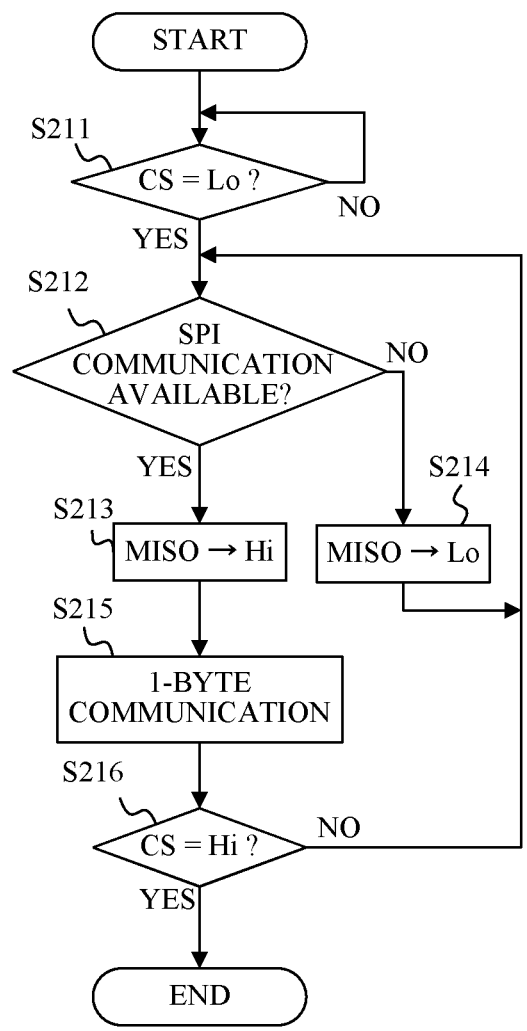

A flowchart in FIG. 3D illustrates processing to be performed by the accessory control circuit 201 in the SPI protocol B.

In S211, the accessory control circuit 201 confirms whether or not CS has changed to a low level. In the case where CS has changed to the low level, the flow proceeds to S212, and in the case where CS has not changed to the low level, the flow returns to S211.

In S212, the accessory control circuit 201 confirms whether or not the SPI communication is available. In the case where the SPI communication is available, the flow proceeds to S213, and in the case where the SPI communication is unavailable, the flow proceeds to S214.

In S213, the accessory control circuit 201 performs control for changing MISO to a high level and the flow proceeds to S215.

In S214, the accessory control circuit 201 performs control for changing MISO to a low level and the flow returns to S212.

In S215, the accessory control circuit 201 controls a MOSI data input and a MISO data output in response to the SCLK signal input and performs 1-byte data communication.

In S216, the accessory control circuit 201 confirms whether or not CS has changed to a high level. If CS has changed to the high level, it is determined that the SPI communication has been completed, and if CS has not changed to the high level, the flow returns to S212 so as to perform the next 1-byte communication.

FIG. 4 illustrates communication contents in notifying an operation execution instruction (command) from the camera 100 to the accessory 200 by the SPI communication in this embodiment.

The camera control circuit B 102 transmits as MOSI data information CMD indicating a command number to the accessory control circuit 201 in the first-byte communication. The accessory control circuit 201 transmits as MISO data a value of 0xA5, which is information indicating a communicable state, to the camera control circuit B 102. In the case where the first-byte communication processing cannot be executed, the accessory control circuit 201 transmits as MISO data a value other than 0xA5 to the camera control circuit B 102.

The camera control circuit B 102 transmits argument MOSI_DATA1 corresponding to the command number CMD to the accessory control circuit 201 in the second-byte communication. Then, from the third byte to the (N−2)th byte, the arguments MOSI_DATA2 to MOSI_DATA [N−3]

corresponding to the command number CMD are similarly transmitted to the accessory control circuit 201.

The accessory control circuit 201 transmits as MISO data the command number CMD received in the first byte to the camera control circuit B 102 in the second-byte communication. This configuration enables the camera control circuit B 102 to determine that the accessory control circuit 201 has correctly received the MOSI data.

The accessory control circuit 201 transmits, as MISO data, return value MISO_DATA1 corresponding to the command number CMD to the camera control circuit B 102 in the third-byte communication. Then, from the fourth byte to the (N−2)th byte, arguments MISO_DATA2 to MISO_DATA [N−4] corresponding to the command number CMD are similarly transmitted to the camera control circuit B 102.

Assume that the number of arguments and the number of return values are previously determined for each command number. One or both of the argument and the return value may not be omitted.

The camera control circuit B 102 transmits checksum data CheckSum_C as MOSI data to the accessory control circuit 201 in the (N−1)th byte communication. The checksum data CheckSum_C is a value calculated by the following expression.

CheckSum_$C$=$EXOR$(AND(SUM(CMD, MOSI_DATA1, . . . ,MOSI_DATA[$N$−3]),0x$FF$), 0x$FF$)

The accessory control circuit 201 transmits 0x00 as MISO data.

Next, the camera control circuit B 102 transmits 0x00 as MOSI data to the accessory control circuit 201 in the Nth-byte communication.

The accessory control circuit 201 transmits checksum data CheckSum_A as MISO data. The checksum data CheckSum_A is calculated by the following expression when the value of CheckSum_C received by the camera control circuit B 102 in the (N−1)th-byte communication and the value of CheckSum_C calculated by the camera control circuit B 102 accord with each other.

CheckSum_$A$=$EXOR$(AND(SUM(0x$A$5,CMD, MIS0_DATA1, . . . ,MOSI DATA[$N$−4]),0x$FF$), 0x$FF$)

On the other hand, if the value of CheckSum_C received by the camera control circuit B 102 in the (N−1)th-byte communication and the value of CheckSum_C calculated by the camera control circuit B 102 do not accord with each other, the value is calculated by the following expression.

CheckSum_$A$=AND(SUM(0x$A$5,CMD, MIS0_DATA1, . . . ,MOSI_DATA[$N$−4]),0x$FF$)

TC11 as a signal contact (communication request contact) illustrated in FIG. 1 is connected with a communication request signal (second input signal)/WAKE for requesting communication from the accessory 200 to the camera 100 (camera control circuit A 101). The communication request signal/WAKE is pulled up to the camera microcomputer power supply VMCU_C via a resistor. The camera control circuit A 101 can detect a communication request from the accessory 200 by detecting a change (trailing edge) in the communication request signal/WAKE.

SDA connected to TC12 as a communication contact and SCL connected to TC13 are signals for performing Inter-Integrated Circuit (I2C) communications (referred to as I2C communication hereinafter) as the first communication method in which the camera control circuit A 101 is a communication master. SDA is a data signal and SCL is a clock signal. SDA and SCL are open-drain communications pulled up by the camera microcomputer power supply VMCU_C, and have communication frequencies of 100 kbps in this embodiment.

In the I2C communication, both data transmission from the camera 100 and data transmission from the accessory 200 are performed via SDA. When the SPI communication and the I2C communication are compared with each other, the communication speed of the I2C communication is lower than that of the SPI communication. The SPI communication has a communication speed higher than that of the I2C communication, and therefore is suitable for information communication having a large amount of data. Therefore, in the communication between the camera 100 and the accessory 200 in this embodiment, information having a large amount of data is communicated by using the SPI communication, and information having a small amount of data is communicated by using the I2C communication. For example, data is first communicated by using the I2C communication, and when the SPI communication is available or needs to be executed based on this data, control can be made to further execute the SPI communication.

Figure 16A:
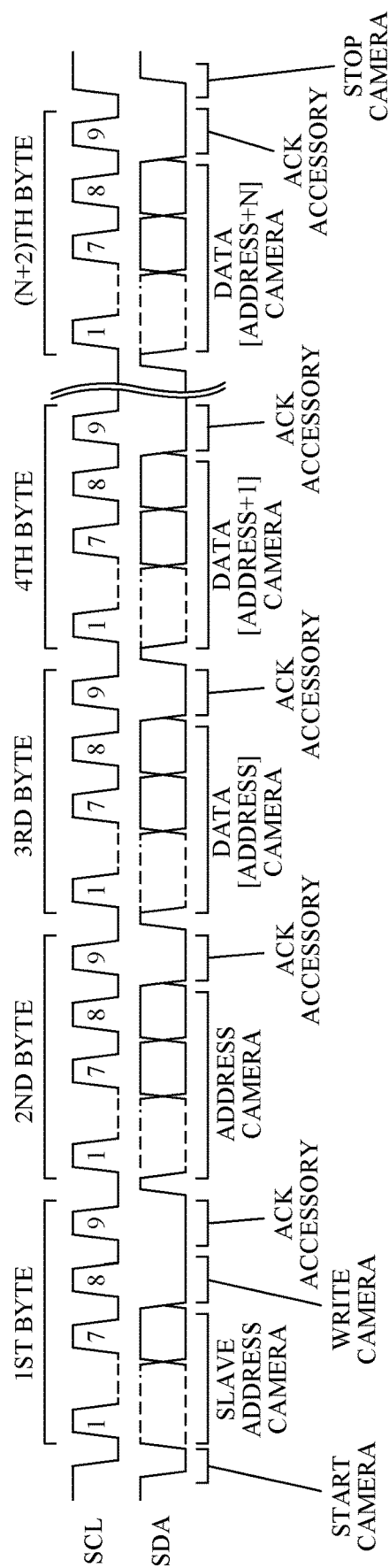
FIGS. 16A and 16B illustrate examples of I2C communication waveforms.
Figure 16B:
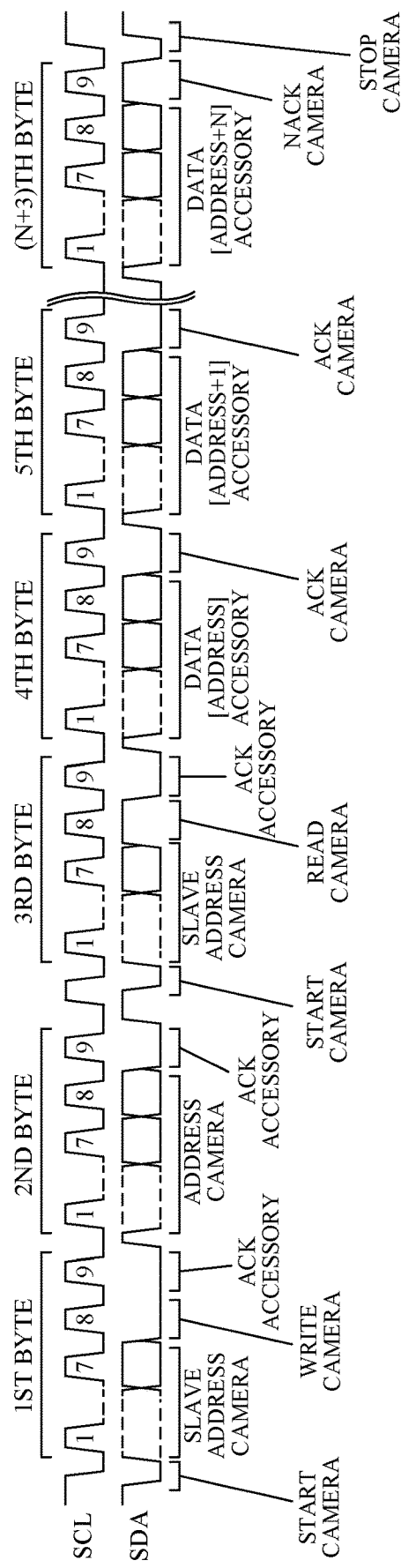

FIGS. 16A and 16B illustrate examples of I2C communication waveforms. FIG. 16A illustrates a waveform example in a case where the camera transmits N-byte data (DATA [1] to DATA [N]) to the accessory, and FIG. 16B illustrates a waveform example in a case where the camera receives N-byte data (DATA [1] to DATA [N]) from the accessory. In FIGS. 16A and 16B, an upper waveform illustrates SCL and a lower waveform illustrates SDA.

Illustrated below the SDA waveform are the meaning of a signal at each timing and whether a control circuit for controlling the output level of the SDA signal is the camera control circuit A 101 or the accessory control circuit 201. The communication data includes 1-byte unit data and 1-bit information indicating a response. A top of each figure illustrates the number of bytes of data from the communication start.

Since details of the communication contents will be described below with reference to FIGS. 17 to 19, an outline will be described with reference to FIGS. 16A and 16B.

In FIG. 16A, in the first-byte communication and the second-byte communication, the camera control circuit A 101 notifies the accessory control circuit 201 of storage address information on data to be transmitted. In the third-byte communication to the (N+2)th-byte communication, the camera control circuit A 101 transmits N-byte data (DATA [ADDRESS] to DATA [ADDRESS+N]) to the accessory control circuit 201.

In FIG. 16B, in the first-byte communication and the second-byte communication, the camera control circuit A 101 notifies the accessory control circuit 201 of storage address information on data to be received. In the third-byte communication to the (N+3)th-byte communication, the camera control circuit A 101 receives N-byte data (DATA [ADDRESS] to DATA [ADDRESS+N]) from the accessory control circuit 201.

Figure 17:
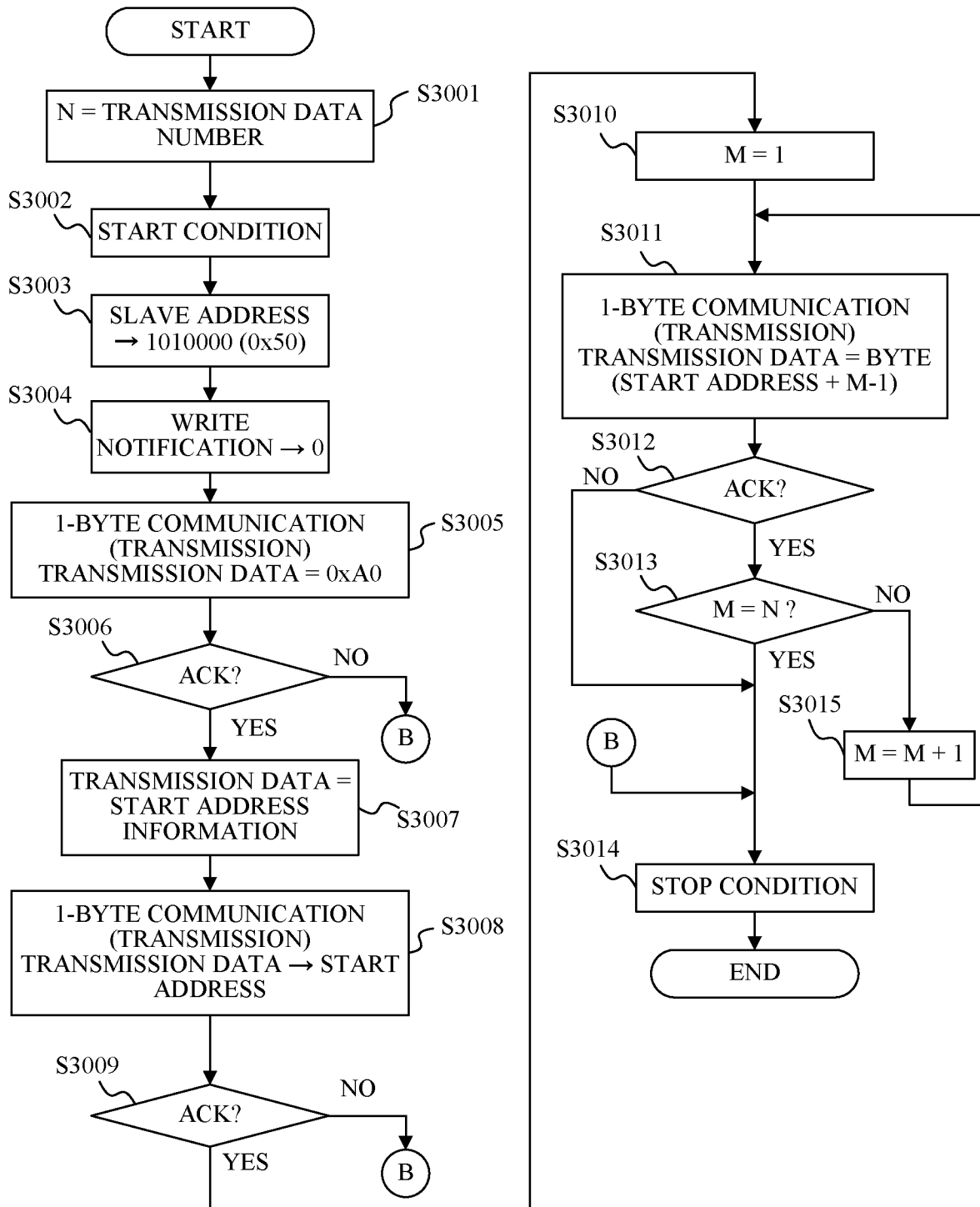
FIG. 17 illustrates processing to be performed by the camera when N-byte data is transmitted from the camera to the accessory in the first embodiment.

A flowchart in FIG. 17 illustrates processing to be performed by the camera control circuit A 101 when the camera control circuit A 101 transmits N-byte data to the accessory control circuit 201.

In S3001, the camera control circuit A 101 stores a numerical value indicating the number of bytes to be transmitted in internal variable N. For example, when 3 bytes are transmitted, 3 is stored. In this embodiment, 3 is stored.

In S3002, the camera control circuit A 101 changes SDA to a low level while SCL is at a high level (START condition). Thereby, the accessory control circuit 201 is notified of a communication start.

In S3003, the camera control circuit A 101 sets slave address information indicating a slave address of the accessory control circuit 201 to the upper 7 bits of the transmission data. In this embodiment, assume that the slave address of the accessory control circuit 201 is 1010000 in binary.

In S3004, the camera control circuit A 101 sets information indicating that it is write communication to the lower 1 bit of the transmission data. Setting this bit to 0 means the write communication.

In S3005, the camera control circuit A 101 transmits to the accessory control circuit 201 data that has been set as the transmission data in S3003 and S3004 (10100000 in binary and 0xA0 in hexadecimal).

In S3006, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to S3007. On the other hand, in the case where the signal level of SDA is high, it is determined that the accessory control circuit 201 has not normally received the data and the flow proceeds to S3014.

In S3007, the camera control circuit A 101 sets to transmission data the storage address information (start address information) of the data to be transmitted to the accessory control circuit 201. In this embodiment, the size of the start address information is 1 byte, and the value is 0x00.

In S3008, the camera control circuit A 101 transmits the set 1-byte start address information (value 0x00) to the accessory control circuit 201.

In S3009, the camera control circuit A 101 outputs SCL for one clock and confirms the signal level of SDA after transmitting the 1-byte start address information data. In the case where the signal level of SDA is low, it is determined to be a data reception notification (ACK) from the accessory control circuit 201 and the flow proceeds to S3010. On the other hand, in the case where the signal level of SDA is high, it is determined that the accessory control circuit 201 has not normally received the data and the flow proceeds to S3014.

In S3010, the camera control circuit A 101 stores 1 in internal variable M. The internal variable M is a variable for counting the number of transmission data.

In S3011, the camera control circuit A 101 outputs 1-byte data to the accessory control circuit 201 by outputting 1-byte SCL and by changing SDA to the desired signal level while SCL is at a low level. Here, the start address information is 0x00 and the internal variable M is 1, and thus 1-byte data corresponding to the address 0x00 is transmitted.

In S3012, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to S3013. On the other hand, in the case where the signal level of SDA is high, it is determined that the accessory control circuit 201 has not normally received the data and the flow proceeds to S3014.

In S3013, the camera control circuit A 101 confirms whether the internal variable M has the same value as that of the internal variable N. In the case where the internal variable M has the same value as that of the internal variable N, it is determined that the transmissions of all data have been completed and the flow proceeds to S3014. In the case where the internal variable M is not the same value as that of the internal variable N, it is determined that there are still data to be transmitted and the flow proceeds to S3015.

In S3015, the camera control circuit A 101 adds 1 to the internal variable M and the flow returns to S3011.

Thus, after the flow returns to S3011, the camera control circuit A 101 sequentially increments the addresses of the data to be transmitted, and transmits 1-byte data corresponding to each address. In this way, the camera control circuit A 101 transmits N-byte data to the accessory control circuit 201 by repeatedly transmitting 1-byte data until the internal variable M and the internal variable N have the same value in the processing in S3013. In the case where the internal variable N is set to 3 as in this embodiment, 3-byte data can be transmitted.

In S3014, the camera control circuit A101 changes SDA to a high level while SCL is at a high level (STOP condition). Thereby, the accessory control circuit 201 is notified of a communication end.

Figure 18:
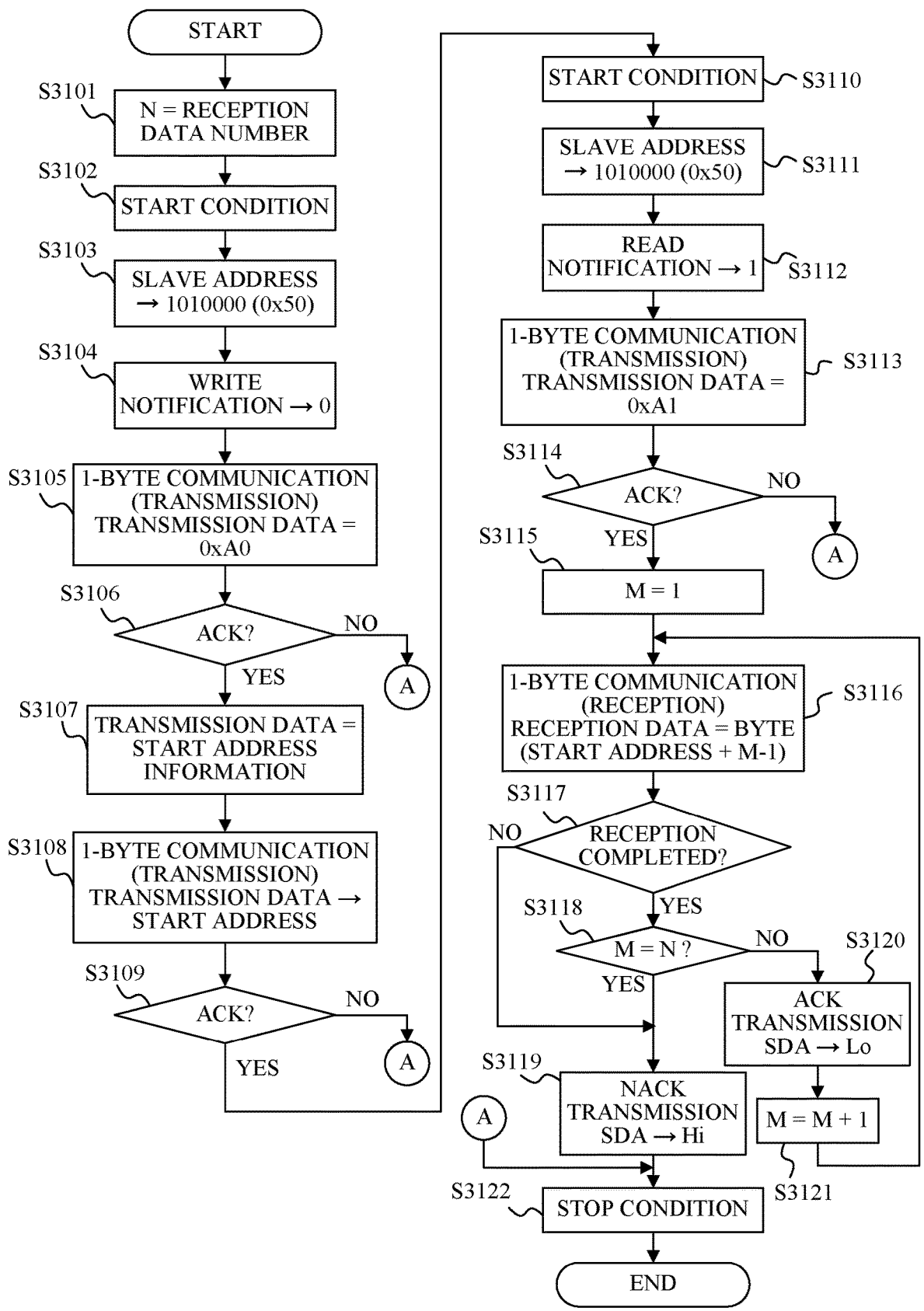
FIG. 18 illustrates processing to be performed by the camera when the camera receives N-byte data from the accessory in the first embodiment.

A flowchart in FIG. 18 illustrates processing to be performed by the camera control circuit A 101 when the camera control circuit A 101 receives N-byte data from the accessory control circuit 201.

In S3101, the camera control circuit A 101 stores a numerical value indicating the number of bytes to be received in internal variable N. For example, in the case where 3-byte data is received, 3 is stored. In this embodiment, 3 is stored.

In S3102 to S3106, the camera control circuit A 101 performs the same processing as S3002 to S3006, respectively, and thus a description thereof will be omitted.

In S3107, the camera control circuit A 101 sets to transmission data storage address information (start address information) of the data received from the accessory control circuit 201. In this embodiment, the size of the start address information is 1 byte, and the value is 0x00.

In S3108, the camera control circuit A 101 transmits the set 1-byte start address information (value 0x00) to the accessory control circuit 201.

In S3109, the camera control circuit A 101 outputs SCL for one clock and confirms the signal level of SDA after transmitting the 1-byte start address information data. In the case where the signal level of SDA is low, it is determined to be a data reception notification (ACK) from the accessory control circuit 201 and the flow proceeds to S3110. On the other hand, in the case where the signal level of SDA is high, it is determined that the accessory control circuit 201 has not normally received the data and the flow proceeds to S3122.

In S3110, the camera control circuit A 101 changes SDA to a low level while SCL is at a high level, and notifies the accessory control circuit 201 of the START condition, as in S3102.

In S3111, the camera control circuit A 101 sets slave address information indicating a slave address of the accessory control circuit 201 to the upper 7 bits of the transmission data. In this embodiment, assume that the slave address of the accessory control circuit 201 is 1010000 in binary.

In S3112, the camera control circuit A 101 sets the information indicating that it is read communication to the lower 1 bit of the transmission data. Setting this bit to 1 means read communication.

In S3113, the camera control circuit A 101 transmits to the accessory control circuit 201 data (10100001 in binary and 0xA1 in hexadecimal) that has been set as the transmission data in S3003 and S3004.

In S3114, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to S3115. On the other hand, in the case where the signal level of SDA is high, it is determined that the accessory control circuit 201 has not normally received the data, and the flow proceeds to S3122.

In S3115, the camera control circuit A 101 stores 1 in internal variable M. The internal variable M is a variable for counting the number of reception data.

In S3116, the camera control circuit A 101 outputs 1-byte SCL and reads the signal level of SDA at a timing when SCL changes from a low level to a high level. This configuration enables the 1-byte data to be received from the accessory control circuit 201. The received 1-byte data can be stored in the volatile memory 125 or used for predetermined processing as data corresponding to the address 0x00.

In S3117, the camera control circuit A 101 determines whether or not 1-byte data has normally been received. In the case of the normal reception, the flow proceeds to S3118. Without the normal reception, the flow proceeds to S3119.

In S3118, the camera control circuit A 101 confirms whether the internal variable M has the same value as that of the internal variable N. If the internal variable M has the same value as that of the internal variable N, it is determined that the receptions of all data have been completed and the flow proceeds to S3119. If the internal variable M is not the same value as that of the internal variable N, it is determined that there are still data to be received and the flow proceeds to S3120.

In S3120, the camera control circuit A 101 provides the accessory control circuit 201 with a data reception notification (ACK) and notifies it of performing continuous data communication by outputting 1-byte SCL and by performing control for changing SDA to a low level.

In S3121, the camera control circuit A 101 adds 1 to the internal variable M and the flow returns to S3116.

Thus, after the flow returns to S3116, the camera control circuit A 101 sequentially increments the address of the data to be received, and receives 1-byte data corresponding to each address. In this way, the camera control circuit A 101 receives N-byte data from the accessory control circuit 201 by repeatedly receiving 1-byte data until the internal variable M and the internal variable N have the same value in the processing in S3118. In the case where the internal variable N is set to 3 as in this embodiment, 3-byte data can be received.

In S3119, the camera control circuit A 101 outputs 1-byte SCL and performs control for changing SDA to a high level to notify the accessory control circuit 201 that the data communication has been completed (NACK).

In S3122, the camera control circuit A101 changes SDA to a high level while SCL is at the high level (STOP condition). Thereby, the accessory control circuit 201 is notified of a communication end.

Figure 19A:
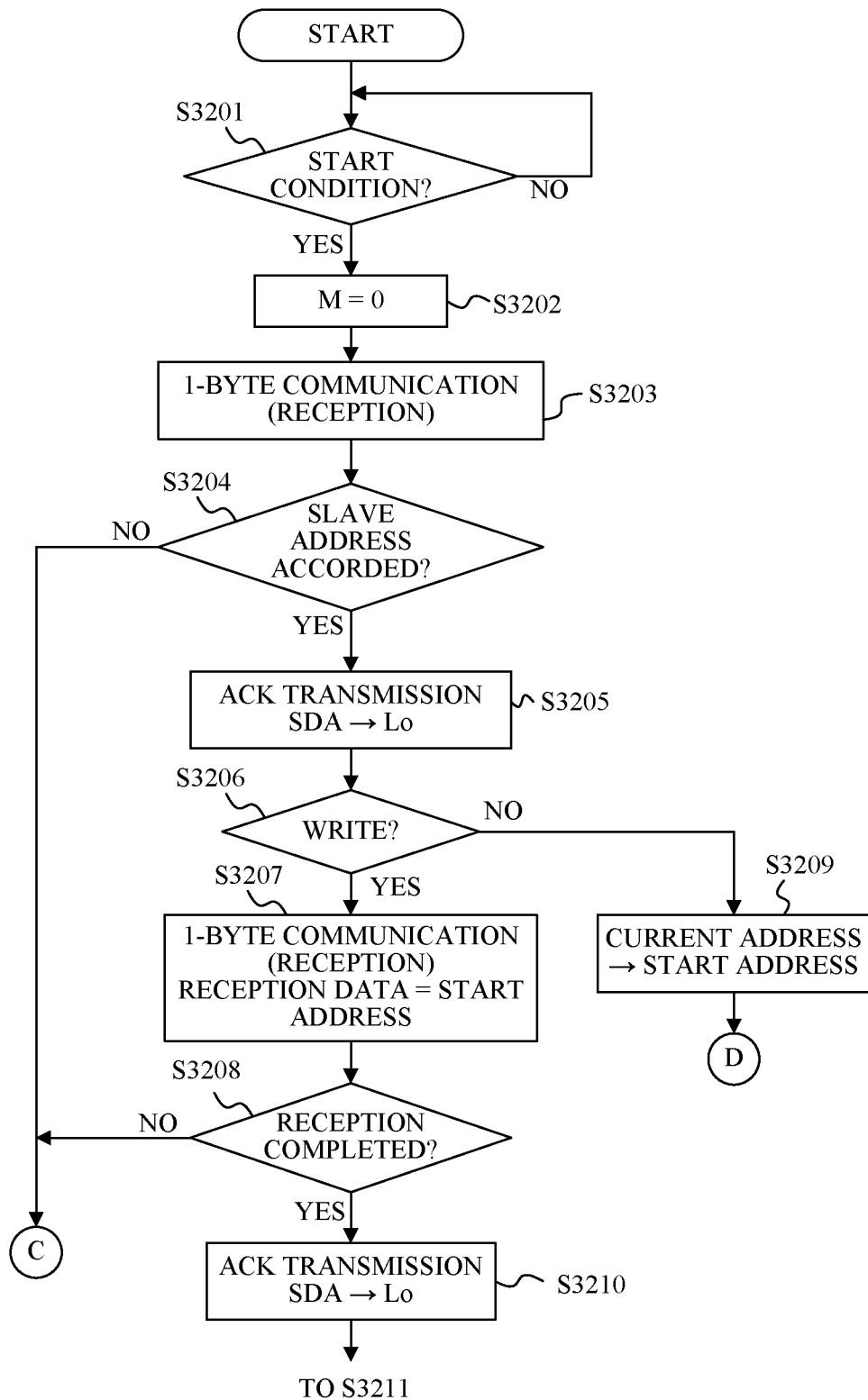
FIGS. 19A and 19B illustrate processing to be performed by the accessory when N-byte data is communicated between the camera and the accessory in the first embodiment.
Figure 19B:
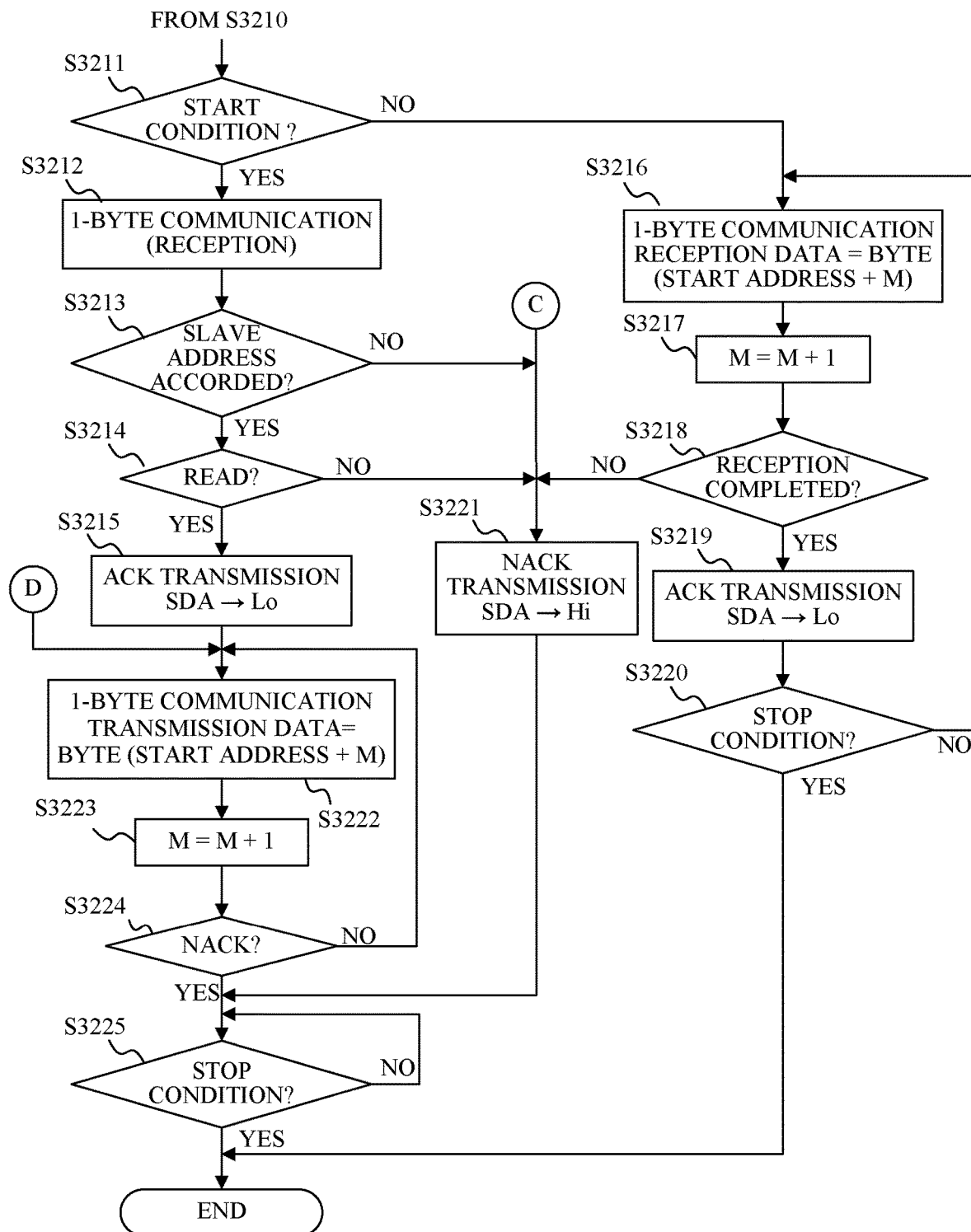

A flowchart in FIGS. 19A and 19B illustrates processing to be performed by the accessory control circuit 201 in the case where the camera control circuit A 101 transmits N-byte data to the accessory control circuit 201 and in the case where the camera control circuit A 101 receives N-byte data from the accessory control circuit 201.

In S3201, the accessory control circuit 201 waits for SDA to change to a low level (START condition) while SCL is at the high level. When the accessory control circuit 201 detects the START condition, the flow proceeds to S3202.

In S3202, the accessory control circuit 201 stores 0 in internal variable M. The internal variable M is a variable for counting the number of transmission data and the number of reception data.

In S3203, the accessory control circuit 201 receives 1-byte data transmitted from the camera control circuit A 101.

In S3204, the accessory control circuit 201 determines whether the upper 7-bit data of the 1-byte data received in S3203 accords with the slave address (0x50 in this embodiment) of the accessory control circuit 201. In the case where the address accords with the slave address of the accessory control circuit 201, the flow proceeds to S3205. In the case where the address does not accord with the slave address of the accessory control circuit 201, the flow proceeds to S3221.

In S3205, the accessory control circuit 201 provides a data reception notification (ACK) to the camera control circuit A 101 by performing control for changing SDA to a low level for the next SCL clock output after receiving the 1-byte data.

In S3206, the accessory control circuit 201 determines the type of data for the next 1-byte communication based on the lower 1-bit data of the 1-byte data received in S3203. In the case where the lower 1-bit data is 0, it is determined that the data of the next 1-byte communication is start address information from the camera control circuit A 101 to the accessory control circuit 201 and the flow proceeds to S3207. In the case where the lower 1-bit data is 1, it is determined that the data of the next 1-byte communication is transmission data from the accessory control circuit 201 to the camera control circuit A 101, and the flow proceeds to S3209.

In S3207, the accessory control circuit 201 receives 1-byte data transmitted from the camera control circuit A 101. The received 1-byte data is information indicating addresses in which data to be transmitted and received in the subsequent communication is stored. In this embodiment, assume that start address information is 0x00 as described with reference to FIGS. 17 and 18.

On the other hand, in S3209, the accessory control circuit 201 uses, for the start address information, address information previously stored in the accessory control circuit 201 or the address information previously notified from the camera control circuit A 101.

In S3208, in the case where the accessory control circuit 201 determines that the 1-byte data could normally be received, the flow proceeds to S3210. In the case where it is determined that the 1-byte data could not normally be received, the flow proceeds to S3221.

In S3210, the accessory control circuit 201 provides a data reception notification (ACK) to the camera control circuit A 101 by performing control for changing SDA to a low level for the next SCL clock output after receiving the 1-byte data.

In S3211, the accessory control circuit 201 confirms whether SDA has changed to the low level (START condition) while SCL is at a high level. In the case where the accessory control circuit 201 detects the START condition, the accessory control circuit 201 determines that 1-byte data to be communicated next is data to be transmitted from the camera control circuit A 101 to the accessory control circuit 201 and indicating a slave address and a communication type. Then, the flow proceeds to S3212. In the case where the accessory control circuit 201 does not detect the START condition, the accessory control circuit 201 determines that the 1-byte data to be communicated next is data information received by the accessory control circuit 201 from the camera control circuit A 101. Then, the flow proceeds to S3216.

In S3212, the accessory control circuit 201 receives the 1-byte data transmitted from the camera control circuit A 101.

In S3213, the accessory control circuit 201 determines whether the upper 7-bit data of the 1-byte data received in S3212 accords with the slave address (0x50 in this embodiment) of the accessory control circuit 201. In the case where the upper 7-bit data accords with the slave address of the accessory control circuit 201, the flow proceeds to S3214. In the case where the upper 7-bit data does not accord with the slave address of the accessory control circuit 201, the flow proceeds to S3221.

In S3214, the accessory control circuit 201 determines a data type for the next 1-byte communication based on the lower 1-bit data of the 1-byte data received in S3203. In the case where the lower 1-bit data is 0, the flow proceeds to S3221. In the case where the lower 1-bit data is 1, it is determined that the data of the next 1-byte communication is transmission data from the accessory control circuit 201 to the camera control circuit A 101 and the flow proceeds to S3215.

In S3215, the accessory control circuit 201 provides a data reception notification (ACK) to the camera control circuit A 101 by performing control for changing SDA to a low level for the next SCL clock output after receiving the 1-byte data.

In S3222, the accessory control circuit 201 transmits to the camera control circuit A 101 1-byte data corresponding to the start address information received from the camera control circuit A 101 in S3207 or the start address information determined in S3209.

In S3223, the accessory control circuit 201 adds 1 to the internal variable M, and the flow proceeds to S3224.

In S3224, the accessory control circuit 201 confirms the signal level of SDA after transmitting the 1-byte data. In the case where the signal level of SDA is high, the camera control circuit A 101 determines that it is a notification (NACK) that all data has been received, and the flow proceeds to S3225. On the other hand, in the case where the signal level of SDA is high, it is determined that the camera control circuit A 101 continues to request a data transmission from the accessory control circuit 201, and the flow returns to S3222. Thus, after the flow returns to S3222, the accessory control circuit 201 sequentially increments the address of the data to be transmitted, and transmits 1-byte data corresponding to each address. Thus, by repeatedly transmitting the 1-byte data from the camera control circuit A 101 until NACK is notified in the processing in S3224, the accessory control circuit 201 transmits N-byte data to the camera control circuit A 101.

In S3225, the accessory control circuit 201 waits for a STOP condition in which the SDA changes to a high level while SCL is at a high level. When the accessory control circuit 201 detects the STOP condition, the communication is terminated.

On the other hand, in S3216, the accessory control circuit 201 receives 1-byte data, and stores the 1-byte data in an unillustrated nonvolatile memory as data corresponding to the start address information received from the camera control circuit A 101 in S3207 or uses it for predetermined processing.

In S3217, the accessory control circuit 201 adds 1 to the internal variable M and the flow proceeds to S3218.

In S3218, if the accessory control circuit 201 determines that 1-byte data could normally be received, the flow proceeds to S3219. If it is determined that the 1-byte data could not normally be received, the flow proceeds to S3221.

In S3219, the accessory control circuit 201 provides a data reception notification (ACK) to the camera control circuit A 101 by performing control for changing SDA to a low level for the next SCL clock output after receiving the 1-byte data.

In S3230, the accessory control circuit 201 confirms whether it has detected the STOP condition in which SDA changes to a high level while SCL is at a high level. In the case where the accessory control circuit 201 detects the STOP condition, the accessory control circuit 201 terminates the communication. On the other hand, in the case where the accessory control circuit 201 does not detect the STOP condition, the accessory control circuit 201 determines that data will be continuously transmitted from the camera control circuit A 101 to the accessory control circuit 201. Then, the flow returns to S3216.

Thus, after the flow returns to S3216, the accessory control circuit 201 sequentially increments an address of data to be received, and receives 1-byte data corresponding to each address. By repeatedly receiving the 1-byte data until the STOP condition is notified in S3220, the accessory control circuit 201 receives N-byte data from the camera control circuit A 101.

Thus, the camera connector 141 includes the contact TC12 for the data signal by the I2C communication method, the contact TC13 for the clock signal by the I2C communication method disposed on one side (adjacent to each other on one side) of the contact TC12 for the data signal. The camera connector 141 further includes the contact TC11 for the second input signal, the contact TC10 for the input selecting signal by the SPI communication method, the contact TC09 for reception by the SPI communication method, the contact TC08 for transmission by the SPI communication, the contact TC07 for the clock signal by the SPI communication method, the contact TC06 for the first input signal, and the contact TC05 for the output signal, which are disposed on the other side (in order from positions adjacent to each other on the other side) of the contact TC12 for the data signal.

The accessory 200 stores accessory information in an unillustrated nonvolatile memory. The accessory information is information for causing the camera 100 to identify the type of the accessory 200 and the specification relating to communication and operation (function) of the accessory 200. FIG. 5 illustrates an example of accessory information. The accessory information is mapped in the memory space at addresses 0x00 to 0x0F, and the accessory information can be read out of the accessory 200 by the I2C communication. Details of the accessory information will be described below. In the I2C communication according to this embodiment, a checksum value for read data is added as the final data of the communication.

An FNC1 signal connected to TC14 as the communication contact illustrated in FIG. 1, an FNC2 signal connected to TC15, an FNC3 signal connected to TC16, and an FNC4 signal connected to TC17 are functional signals whose function is variable according to the type of the attached accessory 200. For example, in the case where the accessory 200 is a microphone device, a signal communicated via TC15 is a signal relating to voice data, and in the case where the accessory 200 is a strobe device, a signal communicated via TC 14 is a signal that notifies the light emission timing.

A signal that realizes a different function may be communicated via the same contact depending on the type of the attached accessory. For example, in a case where the accessory 200 is an accessory other than an illumination device, a synchronization signal for controlling a timing different from a light emission timing may be communicated via TC14. TC14 to TC17 correspond to functional signal contacts. Communication using at least one of the functional signal contacts will be also referred to as functional signal communication. The functional signal communication can be executed at a timing independent of the I2C communication and SPI communication in parallel with the I2C communication and SPI communication.

The accessory type, as used herein, means the above microphone device, illumination device, etc. Accessories that achieve the same purpose, such as illuminations with different performances, belong to the same type of accessories. Accessories that achieve different purposes, such as a microphone device and an illumination device, are different types of accessories. The functional signal communication is executed based on information acquired by the I2C communication or the SPI communication. TC18 as a second ground contact is also connected to GND, and is a contact that serves as a reference potential for the camera 100 and the accessory 200, similarly to TC04. A differential signal D2N connected to TC19 and a differential signal D2P connected to TC20 are data communication signals in which they perform data communications in pairs, and are connected to the camera control circuit B 102. For example, USB communication can be performed via TC19 and TC20.

TC21 is connected to GND and can be used not only as a reference potential contact but also as a contact for controlling wiring impedances of the differential signals D2N and D2P. TC21 corresponds to a fourth ground contact.

The contacts TC01, TC04, TC06, TC18, and TC21 are connected to, for example, a GND portion of a flexible printed circuits (FPC) substrate, and the GND portion of the FPC substrate is fixed to a metallic member which serves as the GND level of the camera 100, with a screw or the like. The metallic member serving as the GND level includes, for example, an engagement member engageable with the accessory 200 in the accessory shoe portion, an unillustrated base plate inside the camera 100, and the like.

In this embodiment, the attachment detecting contact TC06 to which the accessory attachment detecting signal/ACC_DET is connected is disposed next to the contact (first clock contact) TC07 that transmits the clock signal SCLK (first clock signal). In general, noise (clock noise) associated with a potential fluctuation of a clock signal is transmitted to a contact adjacent to the contact of the clock signal, which may cause malfunction. In particular, this influence is significant in a configuration that has many contacts and a short distance between the contacts as in this embodiment. Accordingly, by disposing the attachment detecting contact TC06 next to the SCLK contact TC07, the influence of the clock noise can be suppressed.

The accessory attachment detecting signal/ACC_DET is pulled up before the accessory is attached, but is set to the GND potential after the accessory is attached. On the other hand, since the SCLK contact TC07 for transmitting the clock signal does not transmit the clock signal and the potential does not fluctuate before the accessory is attached. The potential fluctuates because the clock signal is transmitted only after the accessory is attached.

When the SCLK contact TC07 transmits a clock signal, the attachment detecting contact TC06 is at a GND potential. Therefore, even if the attachment detecting contact TC06 receives clock noise, the potentials of the control circuits of the camera 100 and the accessory 200 are less likely to fluctuate, so that malfunction can be prevented. In addition, the clock noise can be restrained from transmitting to a position farther than the attachment detecting contact TC06. As a result, it is unnecessary to provide a GND terminal, and thus the influence of clock noise can be suppressed without increasing the number of contacts.

SCL (second clock signal) as a clock signal is also transmitted to the contact (second clock contact) TC13. However, SCLK transmitted to the SCLK contact TC07 has a higher frequency than that of SCL, and the SCLK contact TC07 generates more clock noise than the SCL contact TC13. Therefore, disposing the attachment detecting contact TC06 next to the SCLK contact TC07 instead of next to the SCL contact TC13 is more effective in preventing malfunction caused by clock noise.

In addition to the difference in frequency, SCL transmitted by the SCL contact TC13 is a clock signal of an I2C communication standard, and a voltage fluctuation of a signal line is driven by the open-drain connection. On the other hand, SCLK transmitted by the SCLK contact TC07 is a clock signal of an SPI communication standard, and a voltage fluctuation of a signal line is driven by the CMOS output. Therefore, the SCL contact TC13 tends to have a gentler edge of the voltage fluctuation than that of the SCLK contact TC07, and clock noise is less likely to occur. Hence, disposing the attachment detecting contact TC06 next to the SCLK contact TC07 rather than next to the SCL contact TC13 is more effective in preventing malfunction caused by clock noise.

The differential signals D1N and D1P may be transmitted in pairs to the first and second differential signal contacts TC19 and TC20 to transmit the clock signal. In that case, a clock signal (third clock signal) having a higher frequency than those of the SCLK contact TC07 and the SCL contact TC13 may be transmitted. However, the differential signals MN and D1P are pair signals, and thus the clock noise emission is less than those of the SCLK contact TC07 and the SCL contact TC13 that transmit single-ended signals. Therefore, it is more effective to prevent malfunction caused by the clock noise by disposing the attachment detecting contact TC06 next to the SCLK contact TC07 instead of next to the first and second differential signal contacts TC19 and TC20.

The contact (first data contact) TC08 disposed next to the SCLK contact TC07 on the opposite side of the attachment detecting contact TC06 transmits MOSI (first data signal). Since MOSI is a data signal, it appears that MOSI is susceptible to clock noise. However, MOSI is a data signal of the same SPI communication standard as the clock signal transmitted by the SCLK contact TC07, and thus the potential fluctuation timing is synchronized with the clock signal and is less likely to be affected by the clock noise. Therefore, the contact TC08 does not have to be fixed to the GND potential and can be used as the MOSI contact.

The accessory 200 has a battery 205 and receives power supply from the battery 205 and also receives power supply from the camera 100 via the camera connector 141 and the accessory connector 211. The accessory control circuit 201 as an accessory processing unit in the accessory 200 is a circuit that controls the entire accessory 200, and includes a processor (microcomputer) such as a CPU. The accessory control circuit 201 executes various controls and processing according to a computer program.

The accessory power supply circuit 202 is a circuit that generates a power supply for supplying power to each circuit in the accessory 200, and includes a DC/DC converter circuit, LDO, a charge pump circuit, and the like. A voltage of 1.8V generated by the accessory power supply circuit 202 is constantly supplied as accessory microcomputer power supply VMCU_A to the accessory control circuit 201. The voltage generated by the accessory power supply circuit 202 may be different from 1.8V. Control over the accessory power supply circuit 202 can provide turning-on and off control over the power supply to each circuit in the accessory 200.

A charging circuit (power-supplied unit) 204 is a circuit for charging the battery 205 using the electric power supplied from the camera 100. The accessory control circuit 201 controls the charging circuit 204 to charge the battery 205 in the case where the accessory control circuit 201 can determine that sufficient power is supplied from the camera 100 to perform a charging operation. In this embodiment, the battery 205 is attached to the accessory 200, but the accessory 200 may be operated only by a power supply from the camera 100 to the accessory power supply circuit (power-supplied unit) 202 without attaching the battery 205. In this case, the charging circuit 204 is unnecessary.

A differential communication circuit 207 is a circuit for performing differential communication with the camera 100, and can communicate data with the camera 100. An external communication IF circuit 208 is an IF circuit for performing data communication with an unillustrated external device, such as an Ethernet communication IF, a wireless LAN communication IF, and a public network communication IF. The accessory control circuit 201 controls the differential communication circuit 207 and the external communication IF circuit 208 to transmit data received from the camera 100 to the external device and data received from the external device to the camera 100.

The functional circuit 206 is a circuit having different functions depending on the type of the accessory 200. The functional circuit 206 is, for example, a light-emitting circuit, a charging circuit, or the like in the case where the accessory 200 is a strobe device. In the case where the accessory 200 is a microphone device, it is a voice codec circuit, a microphone circuit, or the like.

An external connection terminal 209 is a connector terminal for connection to an external device, and is a USB TYPE-C connector in this embodiment. A connection detecting circuit 210 is a circuit for detecting that an external device has been connected to the external connection terminal 209. The accessory control circuit 201 can detect the connection of the external device to the external connection terminal 209 by receiving an output signal of the connection detecting circuit 210.

A power supply switch 203 is a switch operable by the user to turn on and off the power supply (that is, operation) of the accessory 200. The accessory control circuit 201 can detect a turning-on position and a turning-off position by reading a signal level of a terminal to which the power supply switch 203 is connected.

An operation switch 212 is a switch operable by the user to give various instructions to the accessory 200 and to make various settings, and includes a button, a cross key, a slide switch, a dial switch, a touch sensor, and the like. When the operation switch 212 is operated, the accessory control circuit 201 detects the operation and executes predetermined processing according to the operation.

An accessory connector 211 is a connector electrically connectable to the camera 100 via 21 contacts TA01 to TA21 that are arranged in a row. The contacts TA01 to TA21 are arranged in this order from one end to the other end in the arrangement direction.

TA01 is connected to GND and serves not only as a reference potential contact but also as a contact for controlling wiring impedances of the differential signals D1N and D1P. TA01 corresponds to a third ground contact.

The differential signal D1N connected to TA02 and the differential signal D1P connected to TA03 are data communication signals in which they perform data communication in pairs, and are connected to the differential communication circuit 207. TA02, TA03, TA07 to TA10, TA12 to TA17, TA19 and TA20 described below are communication contacts.

TA04 as a first ground contact is connected to GND and serves as a reference potential contact for the camera 100 and the accessory 200. TA04 is disposed outside TA05 described below in the arrangement direction of the contacts.

The accessory power supply circuit 202 and the charging circuit 204 are connected to TA05 as a power supply contact, and the accessory power supply VACC supplied from the camera 100 is connected to TA05.

TA06 as an attachment detecting contact is directly connected to GND. When the accessory 200 is attached to the camera 100, the accessory control circuit 201 sets the accessory attachment detecting signal/ACC_DET described above to a low level (GND potential) as the active potential. Thereby, the camera 100 can detect the attachment of the accessory 200.

SCLK connected to TA07 as a communication contact, MOSI connected to TA08, MISO connected to TA09, and CS connected to TA10 are signals for the accessory control circuit 201 to act as a communication slave to perform SPI communication.

A communication request signal/WAKE for requesting communication from the accessory control circuit 201 to the camera 100 is connected to TA11 as a signal contact (communication request contact). When the accessory control circuit 201 determines that communication with the camera 100 is necessary, the accessory control circuit 201 request the camera 100 for communication by changing the communication request signal/WAKE from a high level to a low level.

When power is supplied from the camera control circuit 101 to the accessory 200 via TC5 in response to detecting an attachment of the accessory 200, the accessory control circuit 201 notifies the camera control circuit 101 that the power supply has been received by changing the signal level (by changing the potential) of the communication request signal/WAKE from a high level to a low level.

The accessory control circuit 201 can notify that there is a factor that causes the accessory 200 to communicate with the camera 100 by changing the signal level (potential) of the communication request signal/WAKE from a high level to a low level even if there is no request from the camera. With this configuration, the camera control circuit 101 can omit an operation of periodically checking, through polling, whether or not the accessory 200 has a factor that requires communication. The accessory 200 can communicate with the camera 100 on a real-time basis when the communication requiring factor occurs.

SDA connected to TA12 as a communication contact and SCL connected to TA13 are signals for the accessory control circuit 201 to serve as a communication slave to perform I2C communication.

Thus, the accessory connector 211 includes the contact TA12 for the data signal by the I2C communication method and the contact TA13 for the clock signal by the I2C communication method, which are disposed on one side of the contact TA12 for the data signal (adjacent to the contact TA12 for the data signal on one side). The accessory connector 211 further includes, on the other side of the contact TA12 for the data signal (in order from a position adjacent to the contact TA12 for the data signal on the other side), the contact TA11 for the second input signal, the contact TA10 for the input selecting signal by the SPI communication method, the contact TA09 for transmission by the SPI communication method, the contact TA08 for reception by the SPI communication method, the contact TA07 for the clock signal by the SPI communication method, the contact TA06 for the first input signal, and the contact TA06 for the output signal.

An FNC1 signal connected to TA14 as a communication contact (functional signal contact), an FNC2 signal connected to TA15, an FNC3 signal connected to TA16, and an FNC4 signal connected to TA17 are functional signals whose functions are variable according to the type of accessory 200. For example, in the case where the accessory 200 is a microphone device, they can be signals relating to voice data, and in the case where the accessory 200 is a strobe device, they can be signals for notifying a light emission timing.

TA18 as a second ground contact is also connected to GND, and is a reference potential contact for the camera 100 and the accessory 200, similar to TA04. The differential signal D2N connected to TA19 and the differential signal D2P connected to TA20 are data communication signals in which they perform data communication in pairs, and are connected to the external connection terminal 209.

TA21 is connected to GND and can be used not only as a reference potential contact but also as a terminal for controlling the wiring impedances of the differential signals D2N and D2P. TA21 corresponds to a fourth ground contact.

The contacts TA01, TA04, TA06, TA18, and TA21 are connected to, for example, the GND portion of the FPC substrate, and the GND portion of the FPC substrate is fixed to a metallic member which serves as the GND level of the accessory 200, with an unillustrated screw. The metallic member serving as the GND level includes, for example, a shoe attachment leg engageable with the accessory shoe portion of the camera 100, an unillustrated base plate inside the accessory 200, and the like.

Figure 6:
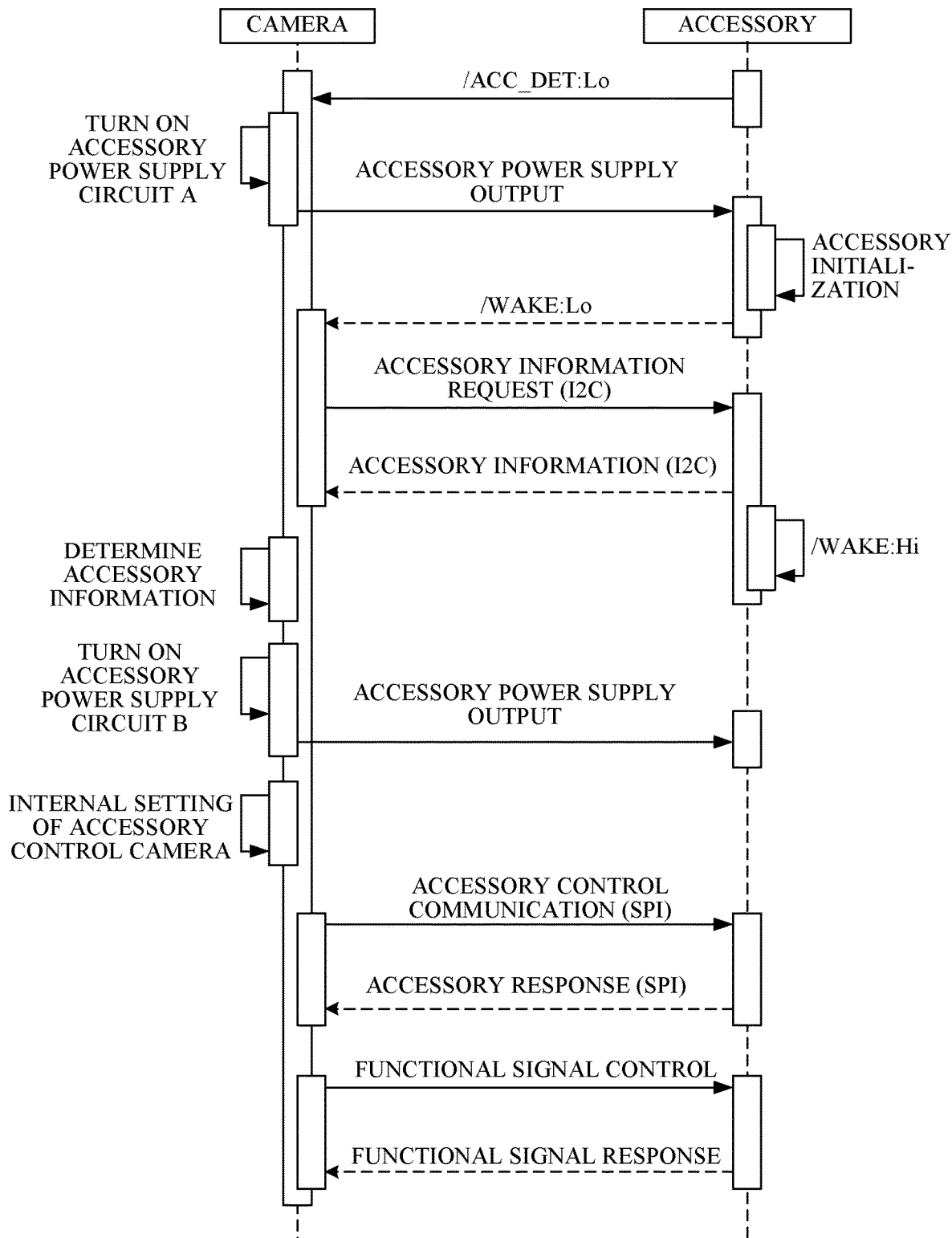
FIG. 6 illustrates a processing sequence of the camera system in the first embodiment.

FIG. 6 illustrates a processing sequence to be performed when the accessory 200 is attached to the camera 100. A description will now be given of a processing outline of each of the camera 100 (camera control circuits A 101 and B 102) and the accessory 200 (accessory control circuit 201), and details will be described below.

When the accessory 200 is attached to the camera 100, the accessory attachment detecting signal/ACC_DET becomes at a low level. Thereby, the camera control circuit A 101 determines that the accessory 200 is attached to the camera 100. The camera control circuit A 101 that has determined that the accessory 200 has been attached sets power supply control signal CNT_VACC1 to a high level in order to turn on the output of the accessory power supply circuit A 131. The accessory power supply circuit A 131 outputs the accessory power supply VACC when the power supply control signal CNT_VACC1 becomes at a high level.

The accessory power supply circuit 202 that has received VACC generates the power supply VMCU_A for the accessory control circuit 201. Thereby, the accessory control circuit 201 is started. The started accessory control circuit 201 initializes each block in the accessory 200. Thereafter, when the accessory control circuit 201 is ready to communicate with the camera 100, the accessory control circuit 201 sets the communication request signal/WAKE to a low level.

The camera control circuit A 101 detects that the accessory 200 is in a communicable state when the communication request signal/WAKE becomes at a low level. The camera control circuit A 101 requests the accessory 200 to communicate the accessory information by the I2C communication. The accessory control circuit 201 that has received the accessory information request transmits the accessory information to the camera control circuit A 101. The accessory control circuit 201 that has transmitted the accessory information sets the communication request signal/WAKE to a high level.

The camera control circuit A 101 determines whether or not the attached accessory is controllable based on the received accessory information. The camera control circuit A 101 turns on the accessory power supply circuit B 132. Then, the camera control circuit A 101 makes various settings for the camera 100, and when completing the settings, the camera control circuit A 101 notifies the camera control circuit B 102 of the accessory information.

The camera control circuit B 102 notifies the accessory 200 of a control command (accessory control communication) or performs control corresponding to a functional signal (functional signal control) by the SPI communication based on the notified accessory information. That is, the camera control circuit B 102 controls the accessory 200 by the SPI communication.

The accessory control circuit 201 responds to the control command by the SPI communication from the camera 100 and is operated in accordance with the functional signal.

A description will now be given of the accessory information illustrated in FIG. 5. D7-D0 data at address 0x00 is information indicating a type of the accessory (referred to as accessory type information hereinafter). FIG. 7 illustrates an example of accessory type information. For example, 0x81 indicates a strobe device, 0x82 indicates an interface conversion adapter device, 0x83 indicates a microphone device, and 0x84 indicates a multi-accessory connection adapter device for attaching a plurality of accessory devices to the camera 100.

The adapter device is an intermediate accessory attached between the camera 100 and the accessory such as a strobe device and a microphone device. The interface conversion adapter device is an adapter device that converts the interface so as to provide compatibility between the camera 100 and the accessory when the interface of the camera 100 and the interface of the accessory are different. The multi-accessory connection adapter device is an adapter device to which a plurality of accessories are attachable.

D7-D0 data at address 0x01 in FIG. 5 is information indicating a model (type) of the accessory 200 (referred to as accessory type information hereinafter). The type and model type of the accessory can be identified by the accessory type information described above and this information.

D7-D0 data at address 0x02 is information indicating a firmware version of the accessory 200.

D7-D6 data at address 0x03 is specification information (referred to as power-off power supply necessity/unnecessity information hereinafter) indicating whether or not a (power) supply of the accessory power supply VACC to the accessory 200 is to be requested in a power-off state (first power-saving state) in which an unillustrated power supply switch of the camera 100 is turned off. In the case where the information is 0, no power supply is requested. In the case where the information is 1, a power supply is requested by the accessory power supply circuit A 131. In the case where the information is 2, a power supply is requested by the accessory power supply circuit B 132.

D5-D4 data at address 0x03 is specification information (referred to as automatic power-off power supply necessity/ unnecessity information hereinafter) indicating whether or not to request the accessory 200 for a supply of the accessory power supply VACC when the camera 100 is in a power-saving state (referred to as an automatic power-off state hereinafter; second power-saving state) by an automatic power-off function. The camera 100 has the automatic power-off function that automatically turns off power when a non-operating state in which no operation is performed continues for a predetermined time for saving power. In the case where the information is 0, it means that no power supply is required. In the case where the information is 1, it means that there is a power supply requested by the accessory power supply circuit A 131. In the case where the information is 2, it means that there is a power supply requested by the accessory power supply circuit B 132.

D3-D2 data at address 0x03 is specification information indicating whether or not the accessory 200 has the battery 205. In the case where the information is 0, it means that the accessory 200 has no battery, and in the case where the information is 1, it means that the accessory 200 has the battery.

D1-D0 data at address 0x03 is specification information (referred to as charging support information hereinafter) indicating whether or not the accessory 200 has a charging function for the battery 205. In the case where the information is 0, it means that the accessory 200 has no charging function, and in the case where it is 1, it means that the accessory 200 has the charging function.

D7-D0 data at address 0x04 is specification information indicating the required power to the accessory power supply VACC with which the accessory 200 is supplied from the camera 100. For example, a value obtained by multiplying this information by 10 indicates a current value. In a case where this information is 10, it means 100 mA, and in a case where this information is 100, it means 1 A. In order to reduce an information amount of this information, this information may be simply associated with a current value. For example, in the case where this information is 0, it may mean 100 mA, in the case where this information is 1, it may mean 300 mA, in the case where this information is 3, it may mean 450 mA, and in the case where this information is 4, it may mean 600 mA.

D7 data at address 0x05 is specification information indicating whether or not the accessory 200 is in a firmware update mode. In the case where the information is 0, it means that the accessory 200 is not in the firmware update mode, and in the case where it is 1, it means that the accessory 200 is in the firmware update mode.

D6 data at address 0x05 is specification information indicating whether or not the accessory 200 has a firmware update function. In the case where the information is 0, it means that the accessory 200 does not have the firmware update function. In the case where the information is 1, it means that the accessory 200 has the firmware update function.

D5-D4 data at address 0x05 is specification information indicating whether or not an operation of the accessory 200 that is attached to an intermediate (connection) accessory is to be permitted. In the case where the information is 0, it means that the operation is not permitted, and in the case where it is 1, it means that the operation is permitted.

D3-D2 data at address 0x05 is specification information indicating whether or not the accessory 200 needs the camera 100 to confirm an attachment of an intermediate accessory when the camera 100 is started. In the case where the information is 0, it means that the confirmation is unnecessary, and in the case where it is 1, it means that the confirmation is necessary.

D1-D0 data at address 0x05 is specification information indicating whether or not the accessory 200 supports a command notification by the I2C communication. In the case where this information is 0, it means that the command notification is not supported, and in the case where it is 1, it means that the command notification is supported.

D5-D4 data at address 0x06 is specification information indicating a communication request factor acquiring method (used communication method: referred to as a factor acquiring method hereinafter) as a communication method that can be used to notify the camera 100 of a generating factor of a communication request after the accessory 200 notifies the camera 100 of communication request signal/WAKE. In the case where the information is 0, it means that the I2C communication method is the factor acquiring method. In the case where the information is 1, it means that the SPI communication method is the factor acquiring method. In the case where the information is 2, it means that each of the I2C communication method and the SPI communication method is the factor acquiring method.

D3-D0 data at address 0x06 is specification information indicating whether or not the accessory 200 has functions corresponding to the FNC1 signal (functional signal 1), the FNC2 signal (functional signal 2), the FNC3 signal (functional signal 3), and the FNC4 signal (functional signal 4). D0 data corresponds to the FNC1 signal, D1 data corresponds to the FNC2 signal, D2 data corresponds to the FNC3 signal, and D3 data corresponds to the FNC4 signal. In the case where the value is 0, it means that the accessory 200 does not have that function. In the case where the value is 1, the accessory 200 has that function.

D7 data at address 0x0A is specification information indicating whether or not the accessory 200 requests the camera 100 for a start when the accessory 200 notifies the camera 100 of the communication request signal/WAKE. In the case where the information is 0, it means that the start is requested, and in the case where it is 1, it means that the start is not requested.

D6-D0 data at address 0x0A is information indicating a generating factor of the communication request signal/WAKE of which the accessory 200 notifies the camera 100.

FIG. 8 illustrates examples of generating factors of the communication request signal/WAKE (also referred to as a communication request factor hereinafter). Here, an example is illustrated in the case where the accessory 200 is a microphone device. For example, a factor number 0x00 is a number indicating that a menu call switch in the operation switch 212 has been operated (pressed). A factor number 0x01 is a number indicating that the accessory 200 has completed an output control of an audio signal. A factor number 0x02 is a number indicating that the accessory 200 has completed mute processing of an audio signal (unmuted). As described above, in this embodiment, information on the communication request factor (number) as the information on the generating factor of the communication request signal/WAKE can be notified (transmitted) from the accessory 200 to the camera 100 as the accessory information.

In FIG. 5, D1 data at address 0x0C is specification information indicating an SPI communication protocol supported by the accessory 200, and in the case where the information is 0, it means that the accessory 200 supports SPI protocol A, and in the case where it is 1, it means that the accessory 200 supports SPI protocol B.

D0 data at address 0x0 is specification information indicating a CS control logic of the SPI communication supported by the accessory 200. In the case where the information is 0, it means that CS is a low-active logic, and in the case where it is 1, it means that CS is a high-active logic.

D7-D0 data at address 0x0D is specification information indicating the time required as a communication byte interval in the case where the accessory 200 performs communication in accordance with the SPI protocol A and the D7 data at the address 0x05 is 0 or the accessory 200 is not in the firmware update mode.

D7-D0 data at address 0x0E is specification information indicating the time required as a communication byte interval when the accessory 200 performs communication in accordance with the SPI protocol A and the data at the address 0x05 D7 is 1 or the accessory 200 is in the firmware update mode.

FIGS. 9A and 9B illustrate the time (communication interval) of the communication byte interval corresponding to the data (0 to 7) at the addresses 0x0D and 0x0E. FIG. 9A illustrates the communication interval for the data at the address 0x0D, and FIG. 8B illustrates the communication interval for the data at the address 0x0E.

In FIG. 5, data at address 0x0F is data of a checksum value indicating a sum of the values at the addresses 0x00 to 0x0E.

Figure 10:
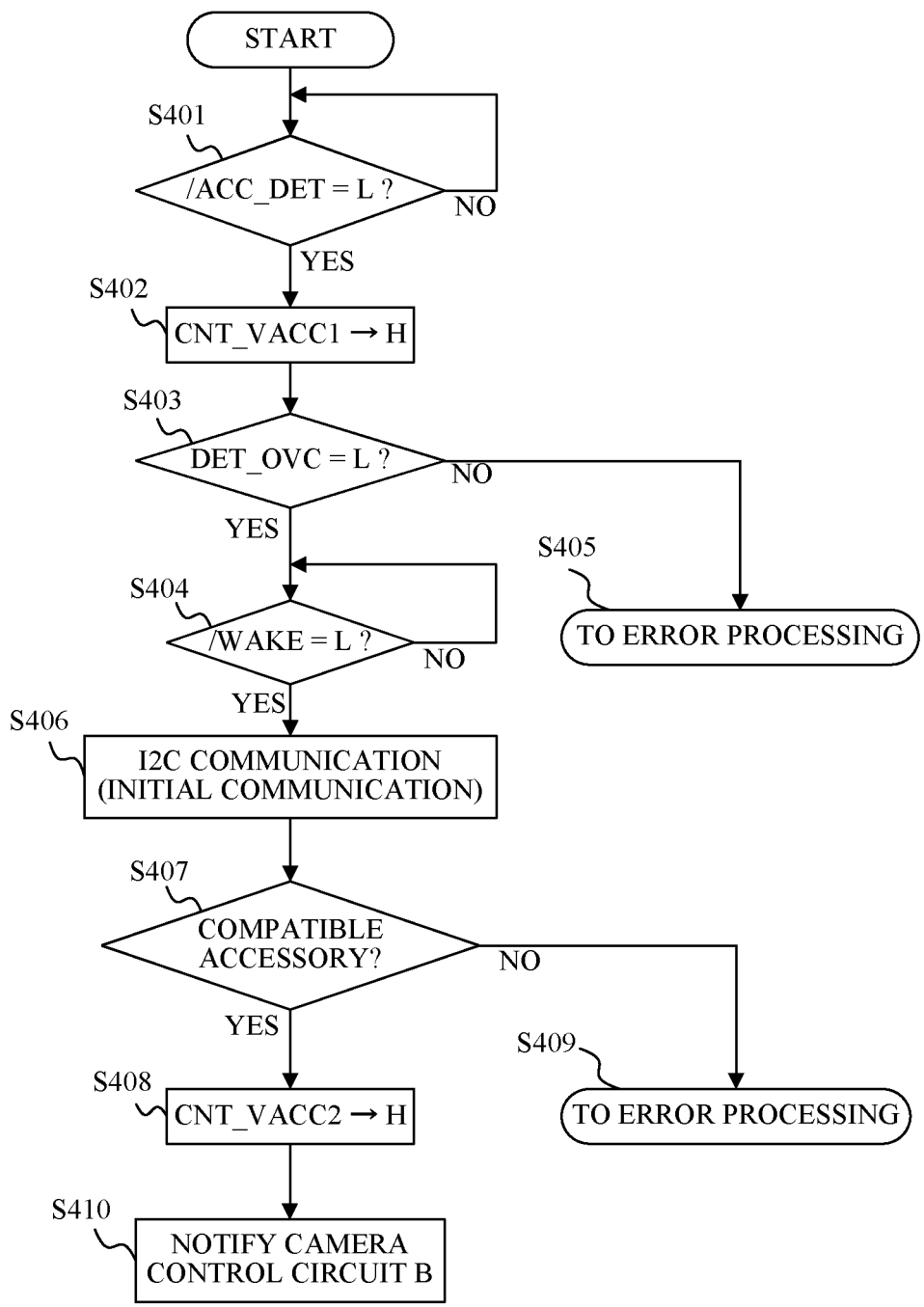
FIG. 10 illustrates a flowchart showing start processing to be performed by the camera (camera control circuit A) in the first embodiment.

FIG. 10 illustrates start processing to be executed by the camera control circuit A 101 until the accessory 200 is attached to the camera 100 and functions of the accessory 200 are enabled.

In S401, the camera control circuit A 101 monitors a signal level of the accessory attachment detecting signal/ACC_DET, and determines (detects) whether or not the accessory 200 is attached. If the signal level of the accessory attachment detecting signal/ACC_DET is high, the camera control circuit A 101 determines that the accessory 200 is not attached and the flow returns to S401. Therefore, the camera control circuit A 101 again determines whether the accessory 200 is attached. If the signal level is low, the camera control circuit A 101 determines that the accessory 200 is attached, and the flow proceeds to S402.

In S402, the camera control circuit A 101 performs control for changing the power supply control signal CNT_VACC1 to a high level in order to turn on the output of the accessory power supply circuit A 131. Then, the flow proceeds to S403. The accessory power supply circuit A 131 outputs the accessory power supply VACC when the power supply control signal CNT_VACC1 is at the high level.

In S403, the camera control circuit A 101 monitors a signal level of the overcurrent detecting signal DET_OVC and determines whether or not an overcurrent is flowing. If the signal level of DET_OVC is low, the camera control circuit A 101 determines that no overcurrent is flowing and the flow proceeds to S404, and if the signal level is high, the camera control circuit A 101 determines that the overcurrent is flowing, and the flow proceeds to S405 to perform error processing.

In S404, the camera control circuit A 101 monitors a signal level of the communication request signal/WAKE as a notification signal from the accessory 200, and determines whether or not an initialization of the accessory 200 has been completed. The camera control circuit A 101 determines that the initialization has been completed if the signal level of the communication request signal/WAKE is low (active), and the flow proceeds to S406. If the signal level is high, the camera control circuit A 101 determines that the initialization has not yet been completed and the flow returns to S404, so that the camera control circuit A 101 again determines whether the initialization has been completed.

In S406, the camera control circuit A 101 performs the I2C communication with the accessory 200 as the initial communication, and reads out 15-byte accessory information. Then, the flow proceeds to S407.

In S407, the camera control circuit A 101 determines whether or not the attached accessory 200 is a compatible device (compatible accessory) with the camera 100 based on the accessory information read out in S406. When the camera control circuit A 101 determines that the attached accessory 200 is the compatible accessory, the flow proceeds to S408, and when the camera control circuit A 101 determines that the attached accessory 200 is not the compatible accessory, the flow proceeds to S409 to perform error processing.

In S408, the camera control circuit A 101 performs control for changing the power supply control signal CNT_VACC2 to a high level in order to turn on the output of the accessory power supply circuit B 132. Then, the flow proceeds to S410. The accessory power supply circuit B 132 outputs the accessory power supply VACC when the power supply control signal CNT_VACC2 is at the high level. In this embodiment, when both the power supply control signals CNT_VACC1 and CNT_VACC2 are at high levels, the output from the accessory power supply circuit B 132 is supplied to the accessory power supply VACC.

In S410, the camera control circuit A 101 notifies the camera control circuit B 102 of the accessory information read out in S406. Thereby, the start processing of the camera 100 in response to the attachment of the accessory 200 is completed.

Figure 11:
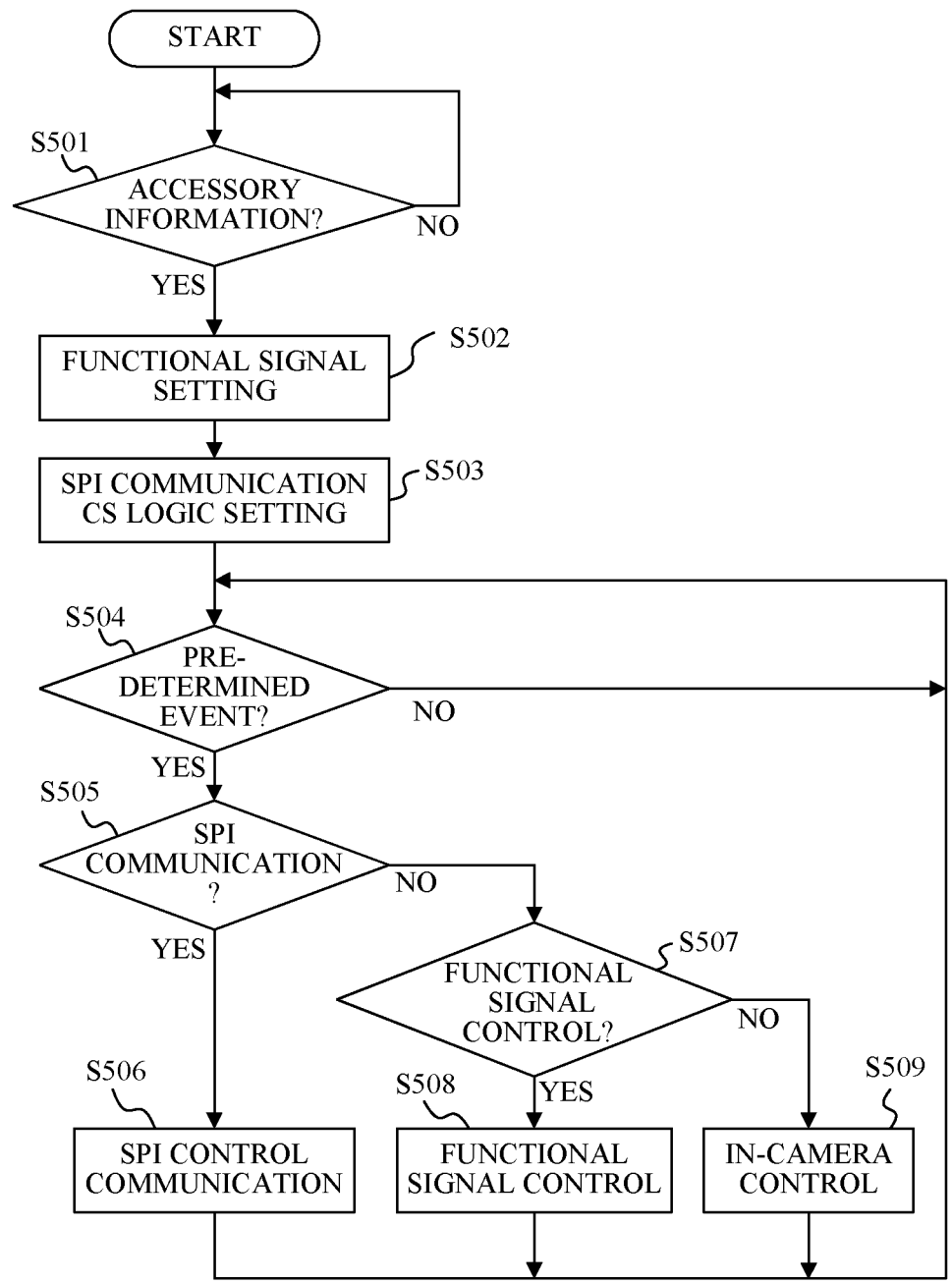
FIG. 11 illustrates a flowchart showing start processing to be performed by the camera (camera control circuit B) in the first embodiment.

A flowchart in FIG. 11 illustrates enabling processing to be executed by the camera control circuit B 102 until the accessory 200 is attached to the camera 100 and the functions of the accessory 200 are enabled.

In S501, the camera control circuit B 102 determines whether or not the accessory information has been notified from the camera control circuit A 101. If the accessory information has not yet been notified, the flow returns to S501 and the camera control circuit B 102 again determines whether or not the accessory information has been notified. If the accessory information has been notified, the flow proceeds to S502.

In S502, the camera control circuit B 102 sets the functional signals FNC1 to FNC4 based on the accessory information notified from the camera control circuit A 101. For example, in the case where it is notified that the accessory 200 is a microphone device, FNC1 is set to function as voice data clock signal BCLK, FNC2 is set to function as voice data channel signal LRCLK, and FNC3 is set to function as voice data signal SDAT. As another example, in the case where it is notified that the accessory 200 is a strobe device, FNC 4 is set to function as strobe emission synchronization signal XOUT. For functional signals that do not require control over the accessory 200, predetermined settings are made so as not to interfere with the operations of the camera 100 and the accessory 200.

In S503, the camera control circuit B 102 sets the CS control logic in SPI communication based on the accessory information notified from the camera control circuit A 101.

In S504, the camera control circuit B 102 determines whether or not a predetermined event for the accessory 200 has occurred. If no event has occurred, the flow returns to S504 and the camera control circuit B 102 again determines whether or not the event has occurred. If the event has occurred, the flow proceeds to S505.

In S505, the camera control circuit B 102 determines whether the event determined in S504 is an event that requires the SPI communication with the accessory 200. The flow proceeds to S506 if the event requires the SPI communication, and the flow proceeds to S507 otherwise.

In S507, the camera control circuit B 102 determines whether or not the event determined in S504 is an event that requires control over the accessory 200 using the functional signal. The flow proceeds to S508 if the event requires the control using the functional signal, and the flow proceeds to S509 otherwise.

In S506, the camera control circuit B 102 performs the SPI communication with the accessory 200. The SPI communication performed here includes, for example, communication of an instruction to turn on the microphone operation, communication of an instruction to turn off the microphone operation, communication of an instruction to switch a sound collection directivity of the microphone, communication of an instruction to switch an equalizer function of the microphone, and the like in the case where the accessory 200 is a microphone device. In the case where the accessory 200 is a strobe device, the SPI communication includes communication for reading out setting information on the strobe device, communication for notifying the strobe device of the setting information, and the like. When the SPI communication in S506 is completed, the flow returns to S504 and the camera control circuit B 102 again determines whether or not the event has occurred.

In S508, the camera control circuit B 102 controls the accessory 200 using a functional signal. For example, in the case where the accessory 200 is a microphone device, the camera control circuit B 102 outputs the audio data clock signal BCLK of FNC1 and the audio data channel signal LRCLK of FNC2, and takes in the audio data signal SDAT of FNC3. Thereby, the camera 100 can acquire voice data from the microphone device. In the case where the accessory 200 is a strobe device, the camera control circuit B 102 outputs the strobe emission synchronization signal XOUT of FNC 4 at a predetermined timing. Thereby, the camera 100 can instruct the strobe device on light emission. When the control using the functional signal is completed in this way, the flow returns to S504 and the camera control circuit B 102 again determines whether or not the event has occurred.

In S509, the camera control circuit B 102 performs predetermined in-camera control according to the event determined in S504. The in-camera control includes, for example, control for starting or ending recording of voice data in the recording memory 126, control for performing equalizer processing for the voice data, and the like, in the case where the accessory 200 is a microphone device. In the case where the accessory 200 is a strobe device, the in-camera control includes photometric control for accumulating and acquiring light emitted by the strobe device using the image sensor 122, control for calculating an indicated value of a light emission amount of the strobe device, and the like. When the in-camera control is thus completed, the flow returns to S504 and the camera control circuit B 102 again determines whether or not the event has occurred.

By the start processing by the camera control circuit A 101 and the enabling processing by the camera control circuit B 102 described above, it is possible to control the accessory 200 that has been attached to the camera 100.

Figure 12:
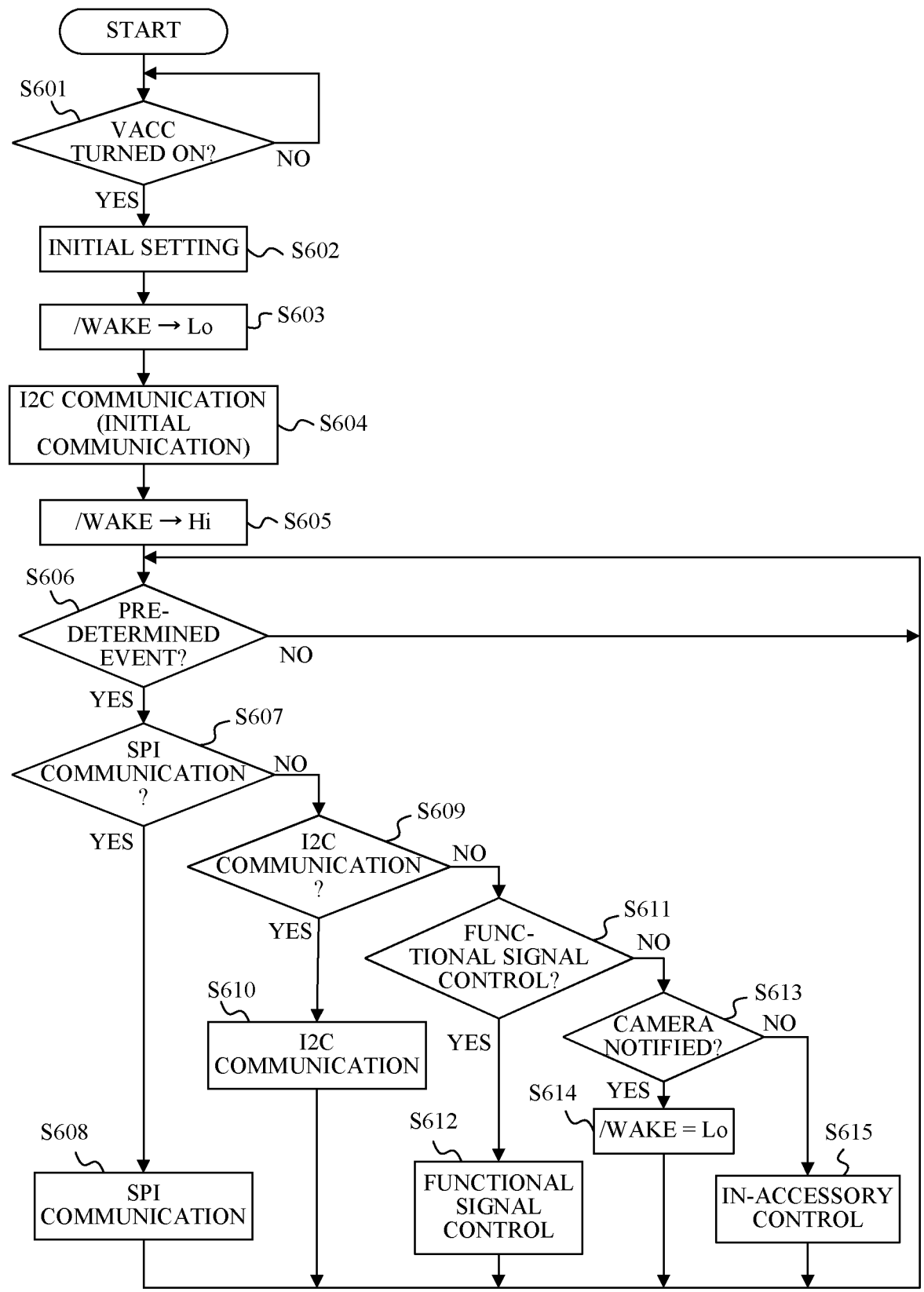
FIG. 12 illustrates a flowchart showing processing to be performed by the accessory in the first embodiment.

A flowchart in FIG. 12 illustrates processing to be executed by the accessory control circuit 201 from when the accessory 200 is attached to the camera 100 to when various functional operations of the accessory 200 are enabled.

In S601, the accessory control circuit 201 waits for the accessory power supply VACC from the camera 100 to be turned on. In the case where the accessory 200 has no battery 205, turning on of the accessory power supply VACC is detectable when power is supplied to the accessory control circuit 201 and the operation of the accessory control circuit 201 itself is started. In the case where the accessory 200 has the battery 205, the accessory control circuit 201 may monitor the voltage value of the accessory power supply VACC to detect that the accessory power supply VACC is turned on.

In S602, the accessory control circuit 201 makes a predetermined initial setting. For example, the accessory control circuit 201 sets an operating frequency of the microcomputer, an input/output control port of the microcomputer, initialization of a timer function of the microcomputer, and initialization of an interrupt function of the microcomputer.

When the initial setting in S602 is completed, in S603, the accessory control circuit 201 performs control for changing the communication request signal/WAKE to a low level. Thereby, the camera 100 is notified that the initial setting is completed.

In S604, the accessory control circuit 201 responds to the I2C communication from the camera 100 and transmits 15-byte accessory information to the camera 100 as the initial communication. The accessory information includes various information illustrated in FIG. 5.

When the initial communication of S604 is completed, in S605, the accessory control circuit 201 controls the communication request signal/WAKE to a high level.

In S606, the accessory control circuit 201 determines whether or not a predetermined event has occurred. If no event has occurred, the flow returns to S606 and the accessory control circuit 201 again determines whether or not the event has occurred, and if the event has occurred, the flow proceeds to S607.

In S607, the accessory control circuit 201 determines whether or not the event determined in S606 is an event that requires the SPI communication with the camera 100. The flow proceeds to S608 if the event requires SPI communication, and the flow proceeds to S609 otherwise.

In S609, the accessory control circuit 201 determines whether or not the event determined in S606 is an event that requires the I2C communication with the camera 100. The flow proceeds to S610 if the event requires the I2C communication, and the flow proceeds to S611 otherwise.

In S611, the accessory control circuit 201 determines whether or not the event determined in S606 is an event that requires control using a functional signal. The flow proceeds to S612 if the event requires the control using the functional signal, and the flow proceeds to S613 otherwise.

In S613, the accessory control circuit 201 determines whether or not the event determined in S606 is an event that requires a notification to the camera 100 by the communication request signal/WAKE. The flow proceeds to S614 if the event requires a notification to the camera 100 by the communication request signal /WAKE, and the flow proceeds to S615 otherwise.

In S608, the accessory control circuit 201 performs the SPI communication with the camera 100. In the case where the communication request signal/WAKE is at a low level when the accessory control circuit 201 executes the SPI communication, the accessory control circuit 201 performs control for changing the communication request signal/ WAKE to a high level after the SPI communication. The SPI communication performed here includes, for example, communication of an instruction to turn on a microphone operation from the camera 100, communication of an instruction to turn off the microphone operation, and communication of an instruction to switch a sound collection directivity of the microphone, in the case where the accessory 200 is a microphone device. The SPI communication further includes communication of an instruction to switch an equalizer function of the microphone. In the case where the accessory 200 is a strobe device, the SPI communication includes communication for reading out setting information on the strobe device, communication for notifying the strobe device of the setting information, and the like. When the predetermined SPI communication in S608 is completed, the flow returns to S606 and the accessory control circuit 201 again determines whether or not the event has occurred.

In S610, the accessory control circuit 201 performs the I2C communication with the camera 100. In the case where the communication request signal/WAKE is at a low level when the I2C communication is executed, control for changing the communication request signal/WAKE into a high level is made after the I2C communication. The I2C communication performed here includes, for example, communication for reading out a communication request factor (number) for the communication request signal/WAKE of which the accessory control circuit 201 has notified the camera 100. When the I2C communication in S610 is completed, the flow returns to S606 and the accessory control circuit 201 again determines whether or not the event has occurred.

In S612, the accessory control circuit 201 controls the camera 100 using a functional signal. The control performed here includes, for example, reception control of the audio data clock signal BCLK of FNC1 and the audio data channel signal LRCLK of FNC2 output from the camera 100, in the case where the accessory 200 is a microphone device. The control further includes output control of the voice data signal SDAT of FNC3 in synchronization with these signals. In the case where the accessory 200 is a strobe device, the control includes reception control of the strobe emission synchronization signal XOUT of FNC4 and corresponding strobe emission control. When the control using the functional signal in S612 is completed, the flow returns to S606 and the accessory control circuit 201 again determines whether or not the event has occurred.

In S614, the accessory control circuit 201 stores a communication request factor number to the camera 100 in response to the event determined in S606 in an unillustrated volatile memory of the accessory 200, and performs control for changing the communication request signal/WAKE to a low level. The communication request factor number is a unique number assigned to each factor content as illustrated in FIG. 8. When the low-level control of the communication request signal/WAKE in S614 is completed, the flow returns to S606 and the accessory control circuit 201 again determines whether the event has occurred.

In S615, the accessory control circuit 201 performs in-accessory control according to the event determined in S606. The in-accessory control performed here includes detecting control of a remaining battery level, detecting control of an operation of the operation switch 212, and the like, in the case where the accessory 200 includes the battery 205. When the in-accessory control in S615 is completed, the flow returns to S606 and the accessory control circuit 201 again determines whether the event has occurred.

By the above processing by the accessory control circuit 201, the accessory 200 can perform various functional operations after the accessory 200 is attached to the camera 100.

Figure 13A:
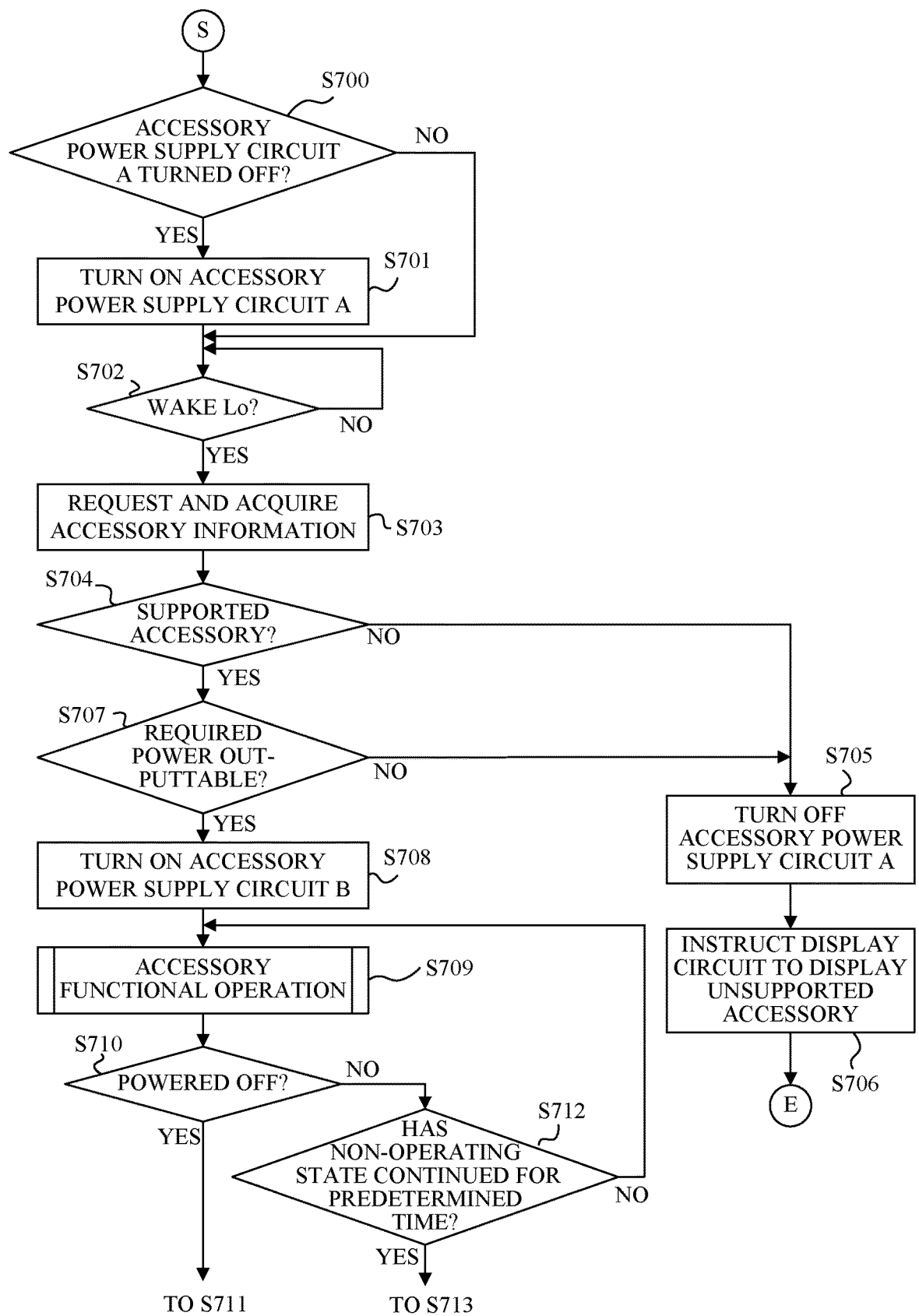
FIGS. 13A and 13B illustrate a flowchart showing processing to be performed by the camera in the first to third embodiments.
Figure 13B:
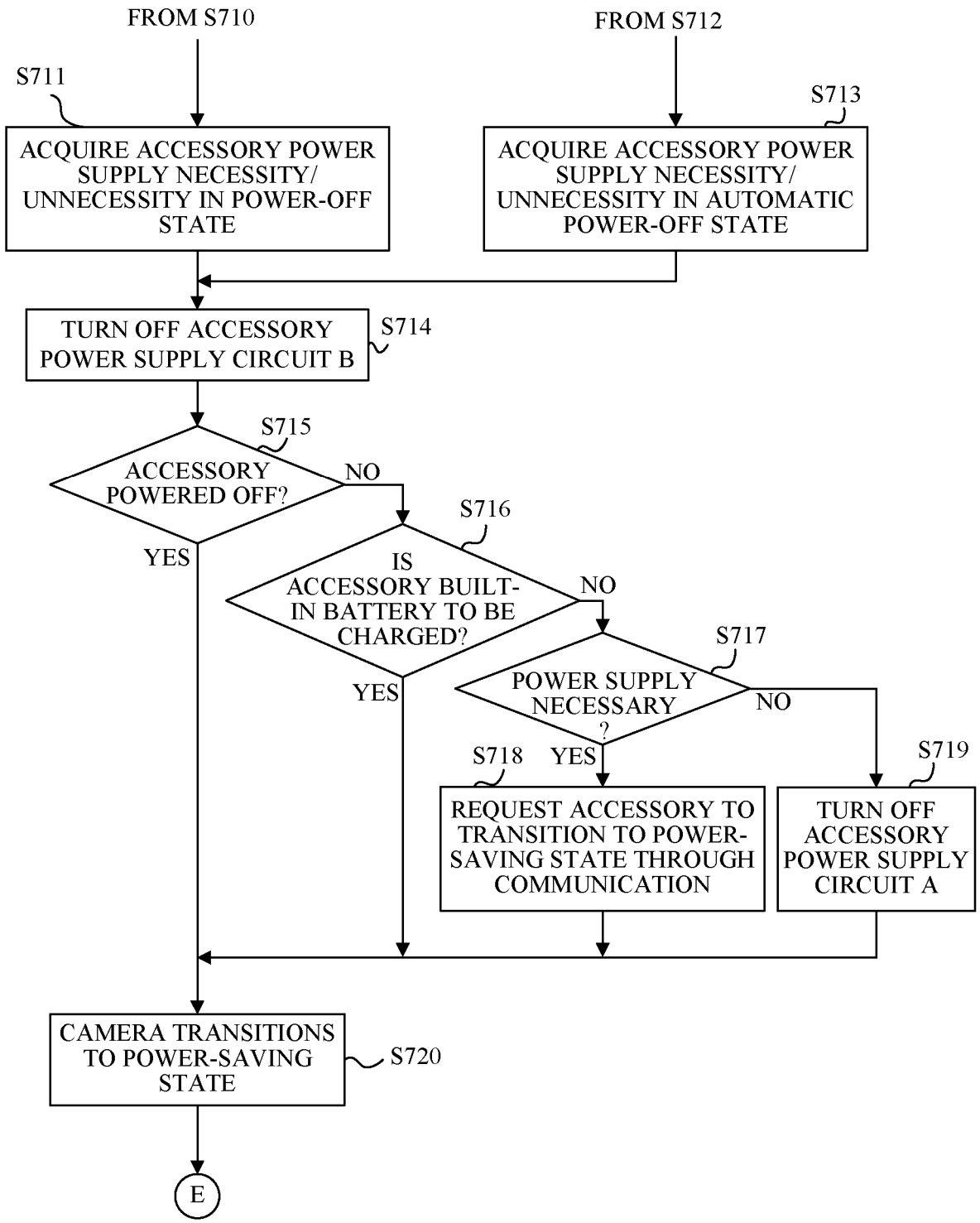

A flowchart in FIGS. 13A and 13B illustrates processing to be executed by the camera 100 (camera control circuit A 101) when the camera 100 is started as a result of that the power supply switch in the camera 100 is turned on or any of operating members is operated in the automatic power-off state.

In S700, the camera control circuit A 101 confirms a turning-on/off state of the accessory power supply circuit A 131. The turning-on/off state of the accessory power supply circuit A 131 may be directly confirmed by reading out a register of a power supply IC in the accessory power supply circuit A 131 or a power supply control I/O level, or the like, or may be confirmed based on a value of the RAM or ROM that logically manages the power supply state. In the case where the accessory power supply circuit A 131 is turned off, the flow proceeds to S701 and the camera control circuit A 101 turns on the accessory power supply circuit A 131. In the case where the accessory power supply circuit A 131 is turned on, the flow proceeds to S702 skipping S701.

In S702, the camera control circuit A 101 waits for completion of initial processing of the accessory 200 (a low level ("Lo") of the communication request signal/WAKE), and the flow proceeds to S703 when the initial processing is completed.

In S703, the camera control circuit A 101 requests the accessory 200 to communicate the accessory information, and acquires (receives) the accessory information illustrated in FIG. 5 from the accessory 200.

In S704, the camera control circuit A 101 reads out the accessory type information (the D7-D0 data at the address 0x00) and accessory model information (the D7-D0 data at the address 0x01) in the accessory information acquired in S703. Then, the camera control circuit A 101 determines whether or not the accessory 200 identified from this information is a compatible accessory (supported accessory) for the camera 100. Information on the type and model of the compatible accessory is recorded in an unillustrated ROM in the camera 100, and the camera control circuit A 101 compares the accessory type information and the accessory model information with the information stored in the ROM, and determines whether or not the accessory 200 is compatible. The flow proceeds to S707 in the case where the accessory 200 is compatible, and proceeds to S705 in the case where the accessory 200 is not compatible.

In S705, the camera control circuit A 101 turns off the accessory power supply circuit A 131. Thereafter, the flow proceeds to S706 and the camera control circuit A 101 causes the display circuit 127 to display that a non-support accessory that is incompatible or unsupported is attached so as to notify the user of this information.

In S707, the camera control circuit A 101 reads out required power (the D7-D0 data at the address 0x04) among the accessory information acquired in S703. Then, the camera control circuit A 101 reads the power (suppliable power) that can be output by the camera 100 from the unillustrated ROM and compares it with the required power. As a result of this comparison, when the required power is higher than the suppliable power, the flow proceeds from S705 to S706 and the camera control circuit A 101 displays that the unsupported accessory is attached to the display circuit 127 to notify the user of this information. On the other hand, when the suppliable power is higher than the required power, the flow proceeds to S708 and the camera control circuit A 101 turns on the accessory power supply circuit B 132.

Figure 15A:
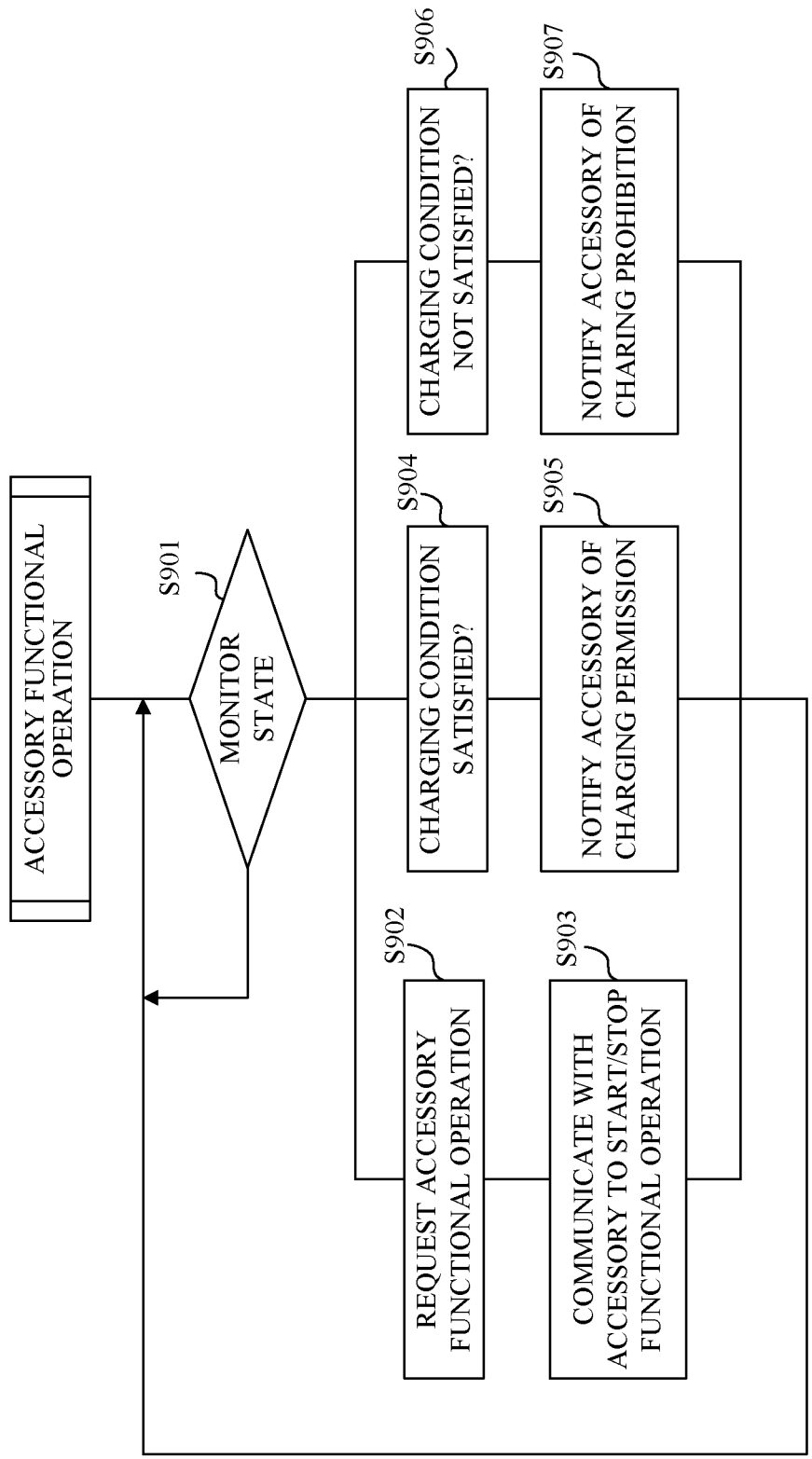
FIGS. 15A and 15B illustrate flowcharts showing processing to be performed by the camera in the first to third embodiments.

Due to the above processing, the power supply processing to the accessory 200 is completed, and the function of the accessory 200 becomes available in S709 by the operation of the camera 100. The processing in S709 will be described below (FIG. 15A).

In S710, the camera control circuit A 101 determines whether or not the power supply switch of the camera 100 has been turned off. The flow proceeds to S711 when the power supply switch has been turned off, and the flow proceeds to S712 when the power supply switch has not been turned off.

In S712, the camera control circuit A 101 determines whether or not no operation has been made on the camera 100 for a predetermined time. The flow returns to S709 without powering off the camera 100 if the non-operating state does not continue for the predetermined time. On the other hand, if the non-operating state continues for the predetermined time (when the camera 100 is powered off by the automatic power-off function), the flow proceeds to S713.

In S711, the camera control circuit A 101 reads out the power-off power supply necessity/unnecessity information (the D7-D6 data at the address 0x03) indicating the necessity/unnecessity of power supply to the accessory 200 in the power-off state among the accessory information acquired in S703. Since the power supply of the camera 100 is cut off in the subsequent S720 in the power-off state, it is unnecessary to operate the camera 100 after the accessory 200 is detached from the camera 100. Therefore, it is unnecessary to include the detection of attachment and detachment of the accessory 200 in a factor for returning the camera 100 from the power-off state in S720. That is, the attachment and detachment of the accessory 200 are not detected in the power-off state. The flow proceeds to S714 from S711.

In S713, the camera control circuit A 101 reads out the automatic power-off power supply necessity/unnecessity information (the D5-D4 data at the address 0x03) indicating the necessity/unnecessity of the power supply to the accessory 200 in the automatic power-off state among the accessory information acquired in S703. The flow proceeds to S714 from S713.

In S714, the camera control circuit A 101 turns off the accessory power supply circuit B 132.

Next, in S715, the camera control circuit A 101 determines the power state of the accessory 200. This determination is made because the power supply to the accessory 200 may be cut off in S709. When the power to the accessory 200 is turned off, the flow proceeds to S716, and when the accessory 200 is not turned off, the flow proceeds to S715.

In S716, the camera control circuit A 101 reads out charging support information (the D1-D0 data at the address 0x03) indicating the presence or absence of the charging function to the battery 205 among the accessory information acquired in S703. The flow proceeds to S720 when the accessory 200 has the charging function to the battery 205 and the camera 100 is in a state for charging the accessory 200 in S904 of FIG. 15A described below.

In S904, it is determined that the camera 100 is in the state for charging the accessory 200 in the case where the used power of the camera 100 is equal to or less than a predetermined value, but the present invention is not limited to this embodiment. The accessory 200 may be always charged with the surplus power of the camera 100. The accessory 200 may be charged after the function of the camera 100 is limited and the output from the battery 111 is secured. If necessary for charging, the accessory power supply circuit B 132 may be turned on. Details of charging the accessory 200 will be described in the third embodiment.

In S716, when the camera control circuit A 101 has determined not to charge the battery 205 in the accessory 200, the flow proceeds to S717.

In S717, the camera control circuit A 101 determines whether or not it is necessary to supply power to the accessory 200 in the power-off state or the automatic power-off state based on the power-off power supply necessity/unnecessity information acquired in S711 or the automatic power-off power supply necessity/unnecessity information acquired in S713. In the case where the power supply is necessary, the flow proceeds to S718 and the camera control circuit A 101 requests the accessory 200 to transition to the power-saving state. On the other hand, in the case where the power supply is unnecessary, the flow proceeds to S719 and the camera control circuit A 101 turns off the accessory power supply circuit A 131.

In S720, the camera control circuit A 101 causes the camera 100 to transition to the power-saving state (power-off state or automatic power-off state).

Figure 14A:
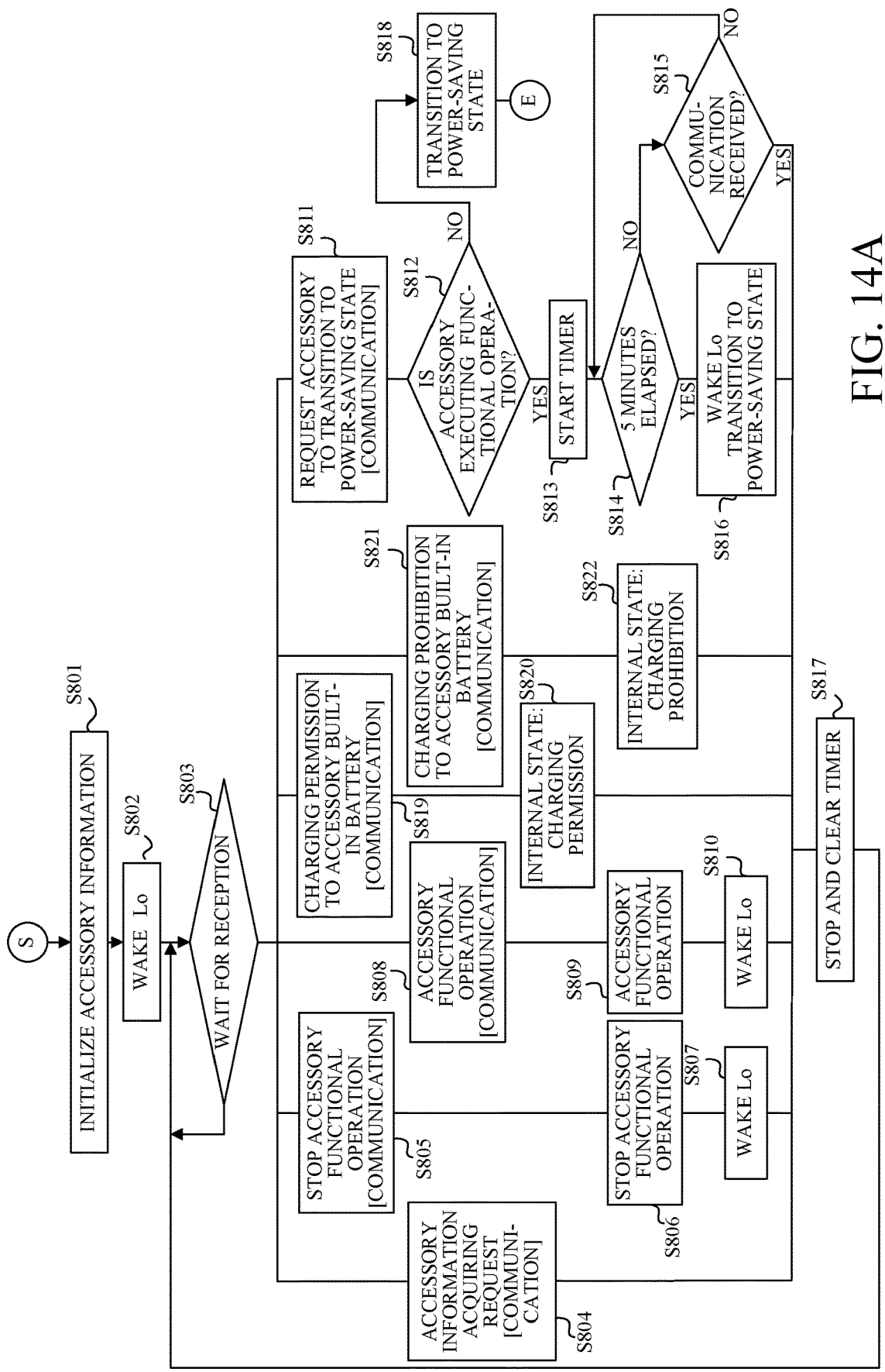
FIG. 14A is a flowchart showing processing to be performed by the accessory in the first to third embodiments.

A flowchart in FIG. 14A illustrates processing to be executed when the accessory 200 (accessory control circuit 201) receives communication from the camera 100. A flowchart in FIG. 14B illustrates processing to be executed by the accessory control circuit 201 as the internal state of the accessory 200 changes.

Figure 14B:
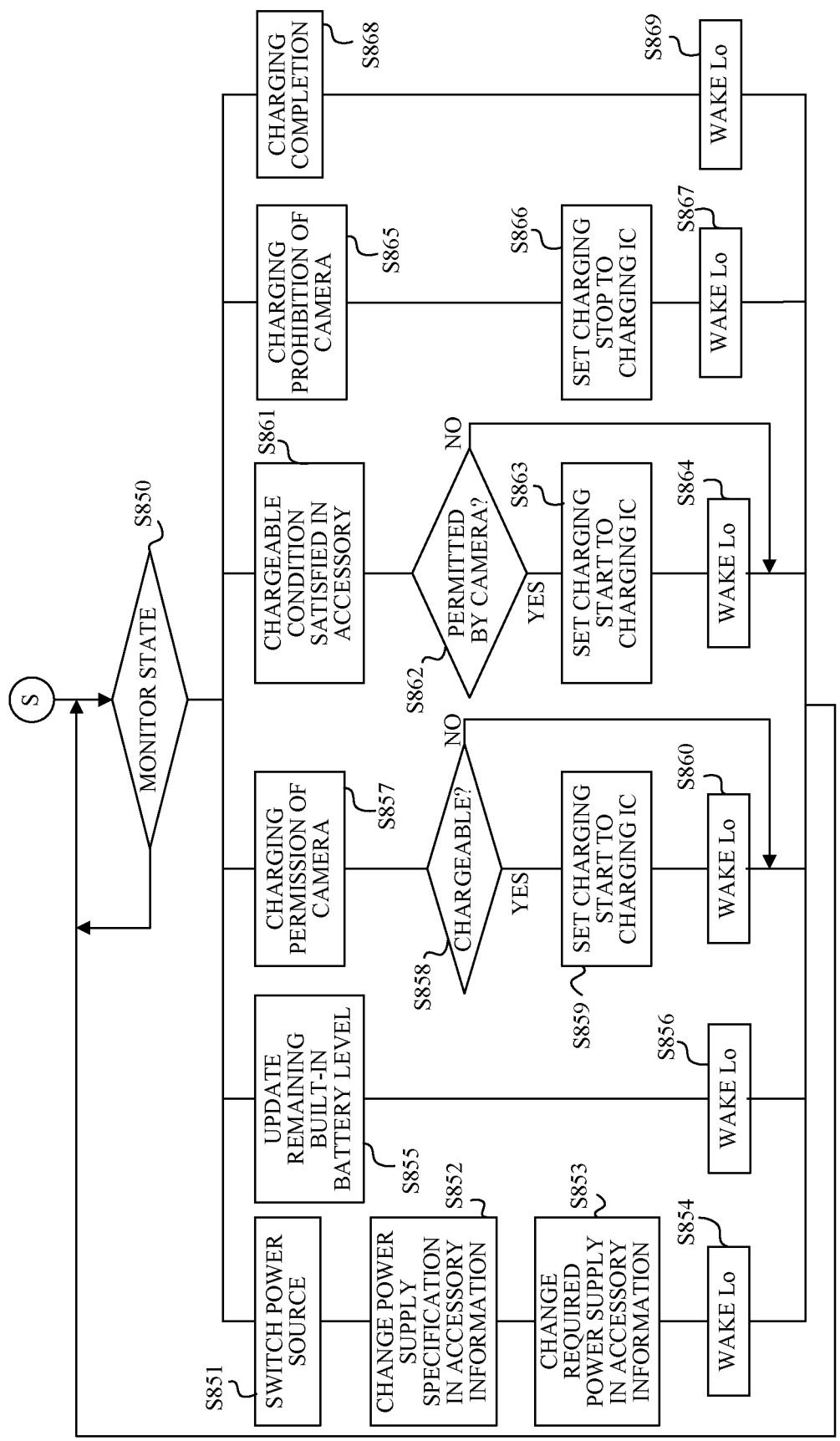
FIG. 14B is a flowchart showing processing to be performed by the accessory in the first to third embodiments.

When the accessory power supply circuit A 131 is turned on in S701 of FIG. 13A, the accessory control circuit 201 is started and the processing in FIGS. 14A and 14B is started.

In S801 of FIG. 14A, the accessory control circuit 201 sets (initializes) the accessory information illustrated in FIG. 5, and performs control for changing the communication request signal/WAKE to a low level in S802. Then, the accessory control circuit 201 waits for communication from the camera 100 in S803. The accessory control circuit 201 starts monitoring a change in the internal state of the accessory 200 in S850 of FIG. 14B.

The camera 100 (camera control circuit A 101) detects the low level of the communication request signal/WAKE in S702 of FIGS. 13A, and performs accessory information acquiring request communication in S703. When the accessory information is requested from the camera 100 in S703 of FIG. 13A, the flow proceeds from S803 to S804 and the accessory control circuit 201 determines reception of the accessory information acquiring request, sets the communication request signal/WAKE to a high level, and transmits the accessory information. When the accessory power supply circuit A 131 is turned off in S705 of FIG. 13A, the power supply to the accessory 200 is cut off and thus the accessory control circuit 201 stops operating.

When the accessory power supply circuit B 132 is turned on in S708 of FIG. 13A, power necessary for the accessory 200 is supplied, so that the functional operation of the accessory 200 (strobe emission, position detection by GPS, voice acquisition by a microphone, etc.) becomes available.

A flowchart in FIG. 15A illustrates the details of the processing performed by the camera control circuit A 101 in S709 of FIG. 13A. The camera control circuit A 101 monitors a change in the state of the camera 100 in S901, and when execution of the functional operation of the accessory 200 is requested (S902), the camera control circuit A 101 instructs the accessory 200 on the execution of the requested functional operation of the accessory 200 in S903 through communication. In response, the accessory control circuit 201 determines reception of the execution instruction of the functional operation of the accessory 200 in S808 of FIG. 14A, sets the communication request signal/WAKE to a high level, and executes the instructed functional operation in S809. Then, in S810, the camera is notified of the execution by setting the communication request signal/WAKE to a low level.

When the request to stop the functional operation of the accessory 200 occurs in S902, the camera control circuit A 101 instructs the accessory 200 to stop the requested functional operation of the accessory 200 in S903 by communication. In response, the accessory control circuit 201 determines reception of the stop instruction for the functional operation of the accessory 200 in S805 of FIG. 14A, sets the communication request signal/WAKE to a high level, and stops the instructed functional operation in S806. Then, in S807, the camera 100 is notified of the stop by setting the communication request signal/WAKE to a low level.

When the camera control circuit A 101 notifies the accessory 200 of a transition request to the power-saving state in S718 of FIG. 13B, the accessory control circuit 201 determines reception of the transition request to the power-saving state in S811 of FIG. 14A and sets the communication request signal/WAKE to a high level, and the flow proceeds to S812. In S812, the accessory control circuit 201 confirms whether or not the accessory 200 is executing the functional operation. The ongoing execution of the functional operation is, for example, that light emission is ready in the case of a strobe device, or that position information is periodically acquired in the case of GPS.

When the accessory control circuit 201 determines in S812 that the accessory is executing the functional operation, the flow proceeds to S813 so as to start a timer. This timer is provided so that the accessory 200 transitions to the power-saving state after a predetermined time (such as 5 minutes) elapses. That is, the functional operation is continued until counting by the timer for the predetermined time is completed, and if there is a communication from the camera 100 before the counting is completed (S814, S815), the state for executing the corresponding functional operation is maintained. More specifically, when there is a request communication for accessory information, the accessory control circuit 201 transmits the accessory information to the camera 100. When there is communication that permits or prohibits charging to the battery 205 in the accessory 200 (S819 or S821), the flow proceeds to S820 or S822 so that the accessory control circuit 201 sets the internal state of the accessory 200 to a charging permission or a charging prohibition.

When the counting for the predetermined time is completed without any communication, the accessory control circuit 201 notifies the camera 100 of the lapse of the predetermined time by changing the communication request signal /WAKE to a low level in S816, and causes the accessory 200 to transition to the power-saving state. The power-saving state of the accessory 200 is a state in which the used power of the accessory 200 does not exceed a suppliable power amount from the camera 100. Thereafter, the accessory control circuit 201 stops and clears the timer in S817.

The camera 100 is in the power-saving state (S720) at this point, but returns to the normal operating state as soon as the communication request signal/WAKE becomes at a low level, and starts the processing in FIGS. 13A and 13B. When the flow proceeds to S709, the camera control circuit A 101 receives the communication request signal/WAKE that is at the low level in S816 in S950 illustrated in the flowchart of FIG. 15B, and the flow proceeds to S951. In S952, the camera control circuit A101 instructs the accessory 200 through communication to stop the function of the accessory 200.

When receiving this stop instruction, the accessory control circuit 201 determines reception of communication from the camera 100 in S803 of FIG. 14A, determines the stop instruction of the functional operation of the accessory 200 in S805, changes the communication request signal/WAKE to a high level, and stops the functional operation in S806. Then, in S807, the accessory control circuit 201 sets the communication request signal/WAKE to a low level, and the camera 100 is notified of the stop of the functional operation.

After stopping the functional operation of the accessory 200 by the low level of the communication request signal/WAKE in S709 of FIG. 13A, the flow proceeds to processing in S714 and S715 and the camera control circuit A 101 requests the accessory 200 to transition to the power-saving state in S718. The accessory control circuit 201 determines the presence of this request in S811 of FIG. 14A. At this time, since the functional operation of the accessory 200 is stopped, the flow proceeds from S812 to S818 to cause the accessory 200 to transition to the power-saving state. Thereafter, the camera 100 also transitions to the power-saving state in S720 of FIG. 13B.

As described above, in the processing illustrated in FIGS. 13A and 13B, the camera 100 according to this embodiment keeps the accessory power supply circuit A 131 turned on even in the power-saving state, and continues to supply power to the accessory 200. Thereby, it is unnecessary to turn on the accessory power supply circuit A 131 when the camera 100 and the accessory 200 are started next time. This configuration can provide a quick recovery from the power-saving state of the imaging system, and avoid a miss of a photo opportunity.

Second Embodiment

An accessory with a built-in battery can be driven using a battery as a power source, which is called self-power. An accessory that does not have a built-in battery is driven by the power supply from the camera, which is called bus power. Whether or not an accessory attached to the camera has a built-in battery is indicated by the power supply specification (the D3-D2 data at the address 0x03) in the accessory information in FIG. 5. If the accessory is self-powered, the required power to the camera is low, and if the accessory is bus-powered, the required power is higher. In the case of the self-power, the battery may run out, so it is necessary to acquire a remaining battery level and control when the remaining battery level becomes lower than a predetermined value.

The self-power and bus power may be switched by a user operation on the operating member provided to the accessory, or may be switched through communication from the camera. The temperature may be measured in the accessory and the self-power and bus power may be switched when the measured temperature is out of a predetermined temperature range. This embodiment controls the accessory 200 such that the accessory 200 is bus-powered when the power supply switch 203 is at an ON position and self-powered when the power supply switch 203 is at an OFF position. The camera control circuit A 101 executes the processing illustrated in FIGS. 13A and 13B regardless of whether the accessory 200 is self-powered or bus-powered. However, in the self-power mode, the processing of S709 is different from that of the bus power mode as described below.

When the power supply switch 203 is operated by the user to the OFF position while the accessory 200 is being driven by the bus power, the accessory control circuit 201 detects that the power supply switch 203 has changed to the OFF position by monitoring the state of the accessory 200 in S850 of FIG. 14B, and switches to the self-power in S851. Thereby, the accessory 200 starts being driven by its power from the battery 205.

Then, the accessory control circuit 201 changes the power supply specification (the D3-D2 data at the address 0x03) in the accessory information to self-power in S852. The accessory control circuit 201 changes the required power in the accessory information (the D7-D0 data at the address 0x04) to the power required for the self-power in S853, and notifies the camera 100 of this change in S854 by changing the communication request signal/WAKE to a low level.

Figure 15B:
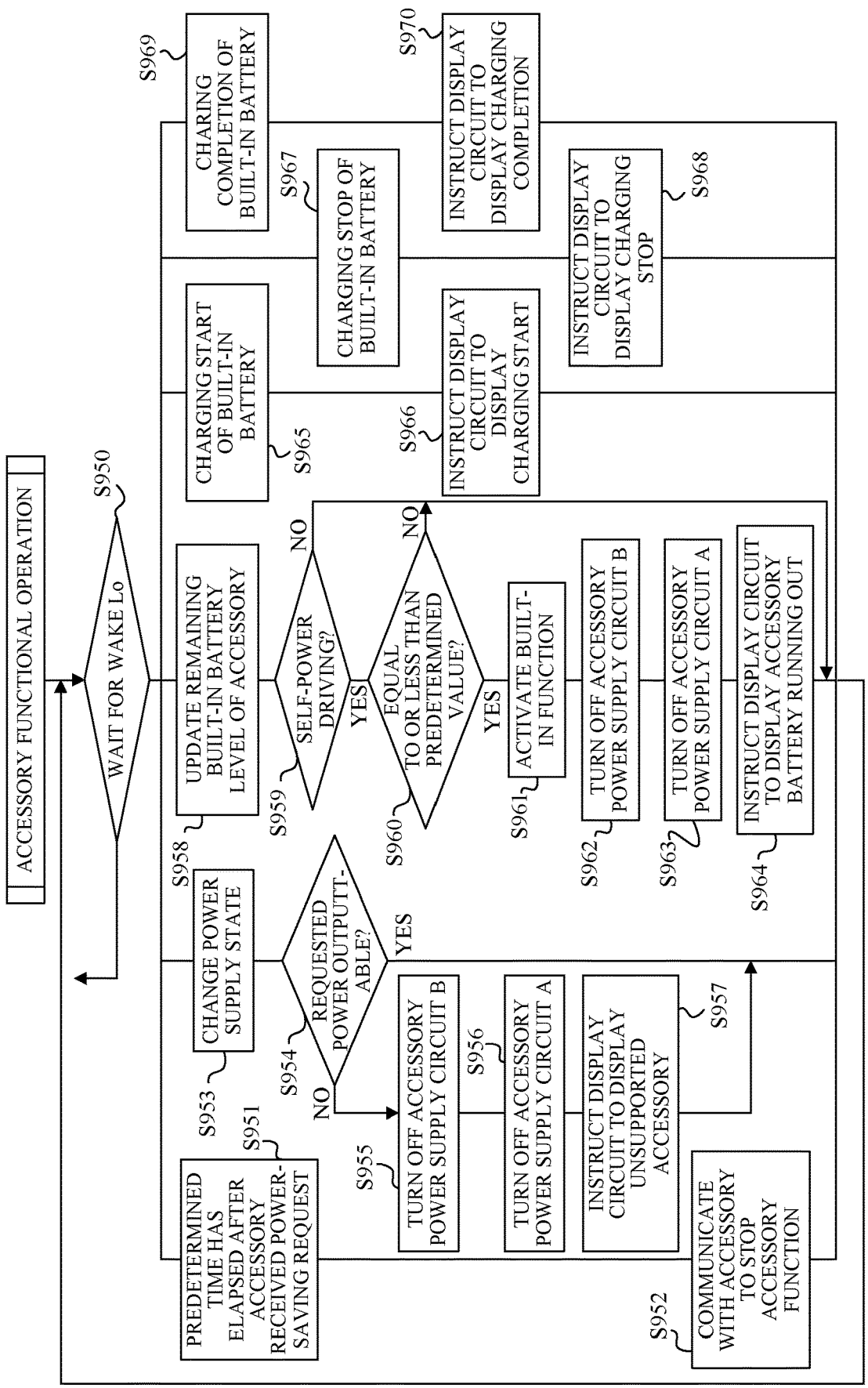

The camera control circuit A 101 that has detected the low level of the communication request signal/WAKE in S950 of FIG. 15B requests the accessory 200 to communicate the accessory information in S953 as in S703 of FIG. 13A, and confirms a change to the self-power of the power supply state by reading out the communication request factor. Then, the camera control circuit A 101 determines whether or not the camera 100 can output the required power in the self-powered driving of the accessory 200, as in S707 of FIG. 13A. In the case where the required output cannot be output, the camera control circuit A 101 performs control for turning off the accessory power supply circuit B 132 in S955, performs control for turning off the accessory power supply circuit A 131 in S956, and performs control for notifying the user that the accessory 200 is unsupported in S957 similarly to S706 in FIG. 13A. When the required power can be output in S954, the camera control circuit A 101 continues the current power supply state.

On the other hand, while the accessory 200 is being driven by self-power, the accessory control circuit 201 periodically acquires information on the remaining level of the battery 205. A change in the battery remaining level is detected in S850 of FIG. 14B. In this case, the accessory control circuit 201 updates the remaining battery level in S855, sets the communication request signal/WAKE to a low level in S856, and notifies the camera 100 of this information.

The camera control circuit A 101 that has detected the low level of the communication request signal/WAKE in S950 of FIG. 15B confirms an update of the remaining battery level in the accessory 200 from the accessory information in S958. In S959, the camera control circuit A 101 ends processing when the power supply specification (the D3-D2 data at the address 0x03) of the previously read accessory information indicates bus power, and the flow proceeds to S960 when the power supply specification indicates self-power.

In S960, the camera control circuit A 101 determines whether or not the remaining battery level of the accessory 200 is equal to or less than the predetermined value. The predetermined value may be 0% or an arbitrary value other than 0%. The predetermined value may be dynamically changed according to the operating state of the camera 100. The flow proceeds to S961 when the remaining battery level is equal to or less than the predetermined value, and the camera control circuit A 101 ends this processing otherwise.

In S961, the camera control circuit A 101 activates the functions in the camera 100. For example, in the case where the accessory 200 is a microphone device, the camera 100 has a built-in microphone as a function, and the battery level of the accessory 200 is less than or equal to the predetermined value, use of the microphone device may be switched to use of the built-in microphone. In the case where the camera 100 does not have a built-in function corresponding to the function of the accessory 200, or in the case where the camera 100 has that built-in function but the switching is unnecessary due to the remaining battery level of the accessory 200, S961 may be skipped.

Thereafter, the camera control circuit A 101 performs control for turning off the accessory power supply circuit B 132 in S962, and performs control for turning off the accessory power supply circuit A 131 in S963. The camera control circuit A 101 causes the display circuit 127 to display that the battery of the accessory 200 has run out in S957.

Third Embodiment

For an accessory with a built-in battery, the battery can be charged by power supplied from the camera. In this embodiment, the camera 100 determines whether to execute charging to the accessory 200. This is to stably supply a charging current from the camera 100 to the accessory 200. However, the accessory control circuit 201 may change the use of the charging power of the battery 205 and the use of the power supplied from the camera 100 within a required power range from the accessory 200.

Charging Permission

When the camera control circuit A 101 detects a change in the state of the camera 100 in S901 of FIG. 15A and confirms that the charging condition is satisfied in S904, the flow proceeds to S905. The charging condition is, for example, that USB is connected to the camera 100 and a power source can be secured, or that the camera 100 transitions to a power-saving state and a charging current can be stably supplied to the accessory 200. In addition, if there is a function in the camera 100 that cannot be used during charging, invalidation of the function may be set to the charging condition. Moreover, no specific condition may be provided and the battery may be always charged.

In S905, the camera control circuit A 101 notifies the accessory 200 of a charging permission. The accessory control circuit 201 receives the charge permission notified from the camera 100 in S803 of FIG. 14A, and the flow proceeds to S819 and S820 so as to set the internal state of the accessory 200 as the charging permission.

The accessory control circuit 201 confirms this charging permission in S857 of FIG. 14B, and determines whether or not the accessory 200 is in a chargeable state in S858. If the accessory 200 is in the chargeable state, the accessory control circuit 201 controls the charging circuit 204 in S859, and sets the communication request signal/WAKE to a low level in order to notify the camera 100 that charging has started in S860.

On the other hand, if it is determined in S858 that the accessory 200 is not in the chargeable state, the accessory control circuit 201 ends this processing. An authentication result of the battery 205 may be used or the temperature of the accessory 200 may be used to determine whether or not the accessory 200 is in the chargeable state in S858. No specific condition may be provided and the battery may always be considered chargeable. In this case, if it is determined in S861 that the charging condition of the accessory 200 is satisfied, it is confirmed in S862 whether or not the camera control circuit A101 has notified the charging permission. In the case where the charging permission is notified, the charging circuit 204 is controlled by 5863, and the communication request signal/WAKE is set to a low level in order to notify the camera 100 that charging has started in S864.

The camera control circuit A 101 that has detected the low level of the communication request signal/WAKE of S860 or S864 in S950 of FIG. 15B acquires a communication request factor from the accessory 200 and the flow proceeds from S965 to S966. In S966, the camera control circuit A 101 causes the display circuit 127 to display a charging start of the accessory 200.

Charging Prohibition

When the camera control circuit A 101 detects the change in the state of the camera 100 in S901 of FIG. 15A and confirms that the charging condition is not satisfied in S906, the flow proceeds to S907 so as to notify the accessory 200 of a charging prohibition.

The accessory control circuit 201 receives the charge prohibition notified from the camera 100 in S802 of FIG. 14A, and the flow proceeds to S821 and S822 so as to set the charging prohibition to the internal state of the accessory 200.

The accessory control circuit 201 confirms this charging prohibition in S850 and S865 of FIG. 14A, and controls the charging circuit 204 in S866 to stop charging. Then, in order to notify the camera 100 that charging has been stopped in S867, the accessory control circuit 201 sets the communication request signal/WAKE to a low level.

The camera control circuit A 101 that has detected the low level of the communication request signal/WAKE of S867 in S950 of FIG. 15B acquires the communication request factor from the accessory 200 and the flow proceeds from S967 to S968. In S968, the camera control circuit A 101 causes the display circuit 127 to display that the accessory 200 has stopped charging.

Charging Completion

In the accessory 200 that is charging, when the accessory control circuit 201 detects a charging completion in S850 and S868 of FIG. 14B, the flow proceeds to S869 and the accessory control circuit 201 sets a communication request signal /WAKE to a low level so as to notify the camera 100 of the charging completion. In other words, when charging is completed and no further power supply from the camera 100 becomes necessary, the accessory control circuit 201 sets the communication request signal/WAKE to a low level and requests the camera 100 for a stop of power supply.

The camera control circuit A 101 that has detected the low level of the communication request signal/WAKE of S869 in S950 of FIG. 15B acquires a communication request factor from the accessory 200 and the flow proceeds from S969 to S970. In S970, the camera control circuit A 101 causes the display circuit 127 to display the charging completion of the accessory 200.

In each of the above embodiments, the first communication method is the I2C communication method and the second communication method is the SPI communication method, but the first and second communication methods may be communication methods other than the I2C and SPI communication methods.

In each of the above embodiments, the accessory is compatible with both the first communication method and the second communication method. However, the accessory is compatible with the first communication method, but may not be compatible with the second communication method.

In each of the above embodiments, the electronic apparatus is the image pickup apparatus, but the electronic apparatus according to the present invention may include various electronic apparatuses other than the image pickup apparatus.

In each of the above embodiments, the accessory 200 is directly attached to the camera 100, but another attachment form may be used. For example, the camera 100 and a main accessory corresponding to the accessory 200 may communicate with each other via the main accessory and an intermediate accessory such as an adapter device to which the camera 100 is attached. In this case, the intermediate accessory may execute communication control similar to at least part of the communication control executed by the accessory 200 and the communication control executed by the camera 100, which are described in the above embodiments. The intermediate accessory may serve as an information transmission path such that the accessory outputs to the main accessory information corresponding to information input from the camera 100 and the main accessory outputs information corresponding to the input information to the camera 100. Thus, the accessory according to the embodiments of the present invention includes various accessories such as a microphone device, an illumination device, and an adapter device. Further, the adapter device can also be included in the electronic apparatus.

Each of the above embodiments can provide an electronic apparatus, a control method of the electronic apparatus, an accessory, and a control method of the accessory, each of which can improve the power-saving performance of the electronic apparatus and quickly secure an operation of the accessory when the accessory is returned from a power-saving state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073066, filed on Apr. 23, 2021, which is hereby incorporated by reference herein in its entirety.

What is claimed is:

1. An electronic apparatus which an accessory is attachable to, detachable from, and communicable with, the electronic apparatus comprising: a power supply unit configured to supply power to the accessory; and
   a control unit configured to control a power supply from the power supply unit to the accessory,
   wherein the electronic apparatus is configured to transition from a normal operating state to a power-saving state that includes a first power-saving state in which a power supply switch of the electronic apparatus is turned off, and a second power-saving state in which a non-operating state continues for a predetermined time,
   wherein the control unit receives from the accessory, as power supply necessity/unnecessity information, first information indicating whether or not the power supply from the electronic apparatus to the accessory is requested when the electronic apparatus is in the first power-saving state, and second information indicating whether or not the power supply from the electronic apparatus to the accessory is requested when the electronic apparatus is in the second power-saving state, and
   wherein, when the first information received from the accessary indicates the power supply is requested, the control unit causes the power supply unit to supply the power to the accessary in the first power-saving state, and when the second information received from the accessary indicates the power supply is requested, the control unit causes the power supply unit to supply the power to the accessary in the second power-saving state.

2. The electronic apparatus according to claim 1, wherein the power supply unit includes a first power supply unit and a second power supply unit configured to supply power higher than that of the first power supply unit, and wherein in a case where the power supply necessity/unnecessity information indicates the request for the power supply, the power is supplied from the first power supply unit to the accessory in the power-saving state.

3. The electronic apparatus according to claim 1, wherein the control unit requests the accessory to transition to the power-saving state in a case where the power is supplied to the accessory in the power-saving state.

4. The electronic apparatus according to claim 1, wherein the control unit does not detect an attachment of the accessory in the first power-saving state, and
   wherein the control unit returns the electronic apparatus to the normal operating state in response to a detection of the attachment of the accessory in the second power-saving state.

5. The electronic apparatus according to claim 1, wherein the control unit controls the power supply from the power supply unit to the accessory in the power-saving state in accordance with the power supply necessity/unnecessity information that has been received in the normal operating state.

6. The electronic apparatus according to claim 1, further comprising an accessory shoe portion to which the accessory is attachable.

7. An accessory attachable to, detachable from, and communicable with an electronic apparatus, the accessory comprising:
   an accessory processing unit configured to transmit information to the electronic apparatus; and a power-supplied unit supplied with power from the electronic apparatus,
   wherein the accessory processing unit transmits, as power supply necessity/unnecessity information, to the electronic apparatus first information indicating whether or not a power supply from the electronic apparatus to the accessory is requested when the electronic apparatus is in a first power-saving state in which a power supply switch of the electronic apparatus is turned off, and second information indicating whether or not the power supply from the electronic apparatus to the accessory is requested when the electronic apparatus is in a second power-saving state in which a non-operating state continues for a predetermined time.

8. The accessory according to claim 7, wherein in a case where the accessory is supplied with the power from the electronic apparatus in the first power saving state or the second power-saving state, when the electronic apparatus requests the accessory to transition to a power-saving state, the accessory processing unit causes the accessory to transition to a power-saving state in which used power of the accessory does not exceed a suppliable power amount from the electronic apparatus.

9. The accessory according to claim 7, wherein the accessory processing unit requests the electronic apparatus to stop the power supply in a case where the accessory becomes in a state where the power supply from the electronic apparatus is unnecessary.

10. The accessory according to claim 7, wherein the accessory processing unit transmits the power supply necessity/unnecessity information to the electronic apparatus when the electronic apparatus is not in the first power-saving state or the second power-saving state.

11. The accessory according to claim 7, wherein the accessory is attachable to an accessory shoe portion of the electronic apparatus.

12. A control method of an electronic apparatus which an accessory is attachable to, detachable from, and communicable with, the electronic apparatus being configured to transition from a normal operating state to a power-saving state that includes a first power-saving state in which a power supply switch of the electronic apparatus is turned off, and a second power-saving state in which a non operating state continues for a predetermined time, the control method comprising the steps of:
   receiving from the accessory, as power supply necessity/unnecessity information, first information indicating whether or not a power supply from the electronic apparatus to the accessory is requested when the electronic apparatus is in the first power saving state, and second information indicating whether or not the power supply from the electronic apparatus to the accessory is requested when the electronic apparatus is in the second power-saving state,
   supplying, when the first information received from the accessary indicates the power supply is requested, the power to the accessary in the first power-saving state, and
   supplying, when the second information received from the accessary indicates the power supply is requested, the power to the accessary in the second power-saving state.

13. A control method of an accessory attachable to, detachable from, and communicable with an electronic apparatus, the control method comprising the steps of: transmitting, as power supply necessity/unnecessity information, to the electronic apparatus first information indicating whether or not a power supply from the electronic apparatus to the accessory is requested when the electronic apparatus is in a first power-saving state in which a power supply switch of the electronic apparatus is turned off, and second information indicating whether or not the power supply from the electronic apparatus to the accessory is requested when the electronic apparatus is in a second power-saving state in which a non-operating state continues for a predetermined time.

* * * * *